US006451283B1

(12) United States Patent
Kuznicki et al.

(10) Patent No.: US 6,451,283 B1
(45) Date of Patent: Sep. 17, 2002

(54) MACROSCOPIC AGGREGATES OF MICROCRYSTALLINE ZEOLITES

(75) Inventors: Steven M. Kuznicki, Whitehouse Station; Tadeusz W. Langner, Linden; Jacqueline S. Curran, Cranford; Valerie A. Bell, Edison, all of NJ (US)

(73) Assignee: Engelhard Corporation, Iselin, NJ (US)

(*) Notice: Subject to any disclaimer, the term of this patent is extended or adjusted under 35 U.S.C. 154(b) by 0 days.

(21) Appl. No.: 09/533,771

(22) Filed: Mar. 23, 2000

(51) Int. Cl.[7] .......................... C01B 39/02; C01B 39/18; C01B 39/28; C01B 39/22
(52) U.S. Cl. ............... 423/716; 423/712; 423/DIG. 21; 423/DIG. 24
(58) Field of Search .................. 423/700, 710, 423/712, 716, DIG. 21, DIG. 24

(56) References Cited

U.S. PATENT DOCUMENTS

| | | | | |
|---|---|---|---|---|
| 3,094,383 A | * | 6/1963 | Dzierzanowski et al. | |
| 3,112,176 A | | 11/1963 | Haden, Jr. | |
| 3,650,687 A | * | 3/1972 | McDaniel et al. | |
| 4,603,040 A | * | 7/1986 | Kuznicki et al. | |
| 4,606,899 A | * | 8/1986 | Butter et al. | |
| 4,650,654 A | * | 3/1987 | Arika et al. | |
| 4,818,508 A | * | 4/1989 | Flank et al. | |
| 4,891,200 A | * | 1/1990 | Fajula et al. | |
| 5,011,667 A | * | 4/1991 | Kuznicki et al. | |
| 5,460,796 A | * | 10/1995 | Verduijn et al. | 423/700 |
| 5,512,266 A | | 4/1996 | Brown et al. | |
| 5,558,851 A | * | 9/1996 | Miller | 423/702 |
| 5,948,383 A | | 9/1999 | Kuznicki et al. | |
| 5,993,773 A | * | 11/1999 | Funakoshi et al. | 423/709 |
| 6,004,527 A | * | 12/1999 | Murrell et al. | 423/712 |

* cited by examiner

Primary Examiner—David Sample
(74) Attorney, Agent, or Firm—Stuart D. Frenkel

(57) ABSTRACT

This invention relates to zeolitic molecular sieve compositions and hybrid zeolite-silica compositions characterized by novel morphology in which the zeolite is present as macroscopic aggregates of microcrystalline zeolite. The zeolitic compositions of this invention have outstanding capability to complex multivalent cations, especially calcium due to the high exchange kinetics of the microcrystalline zeolite component and yet have the ease of handling due to the macroscopic aggregate assemblage.

37 Claims, 5 Drawing Sheets

A) Dried Zeolite P
B) Wet Zeolite P

MACROSCOPIC AGGREGATES OF MICROCRYSTALLINE ZEOLITES

BACKGROUND OF THE INVENTION

This invention relates to zeolitic molecular sieve compositions characterized by outstanding capability to complex multivalent cations, especially calcium. In particular, the invention relates to zeolitic molecular sieve compositions, especially those based on molecular sieves having a high aluminum content, in which the zeolites are characterized by novel particulate morphology. The invention also relates to novel methods of forming zeolites to increase rates of zeolite crystallization, provide the novel morphology and provide a direct effect on sequestration performance.

With environmental concerns over phosphates rising during the last generation, zeolite molecular sieves have taken a dominant role as the water softening builder component of most detergents. Environmentally "friendly", zeolites have been a poor substitute for phosphates from a performance standpoint, having both lower calcium and magnesium sequestration capacities as well as much lower rates of sequestration. The sequestration properties of zeolites arise from their ability to ion exchange. This ion-exchange ability derives from tetrahedral Al(III) inherent in classical zeolite frameworks. Each aluminum induces one negative charge on the framework which is counterbalanced by an exchangeable cationic charge. Thus, exchange capacity is limited by the aluminum content and "detergent" zeolites have been restricted to the relatively short list of "high aluminum" zeolites. By Lowenstein's Rule, the Si/Al ratio of a zeolite may not be lower than 1.0 and concomitantly, the aluminum content may not exceed 7.0 meq per gram for an anhydrous material in the sodium form. This capacity may alternatively be expressed as 197 mg CaO per gram zeolite (anhydrous) when water softening is the desired exchange reaction. Zeolites demonstrating this maximum aluminum content include Zeolite A, high aluminum analogs of Zeolite X and high aluminum analogs of gismondine (often referred to as Zeolite B, P or MAP).

While Zeolite A has been the "detergent zeolite" of choice for years, the possibility of employing a high aluminum version of gismondine-type materials in calcium sequestration has been known for more than a generation (U.S. Pat. No. 3,112,176 Haden et al.) and has recently found renewed interest (for example, U.S. Pat. No. 5,512,266 Brown, et al.). In addition to zeolites, the ability of silicates to complex ions such as calcium and especially magnesium has long been known and sodium silicate has long been employed as a cheap, low performance detergent builder. More recently, complex silicates such as Hoechst SKS-6 have been developed which are claimed to be competitive with higher performance zeolites.

The capacity for silicates to complex ions such as calcium and magnesium is inversely proportional to silicate chain length and directly proportional to the electronic charge on that chain fragment. Silicates depolymerize with increasing alkalinity. At moderate pH (where wash cycles are conducted) silicates are polymeric. However, at much higher pH's silica not only becomes predominantly monomeric, but that monomer may possess multiple charges. If such small, highly charged silicate fragments could be exposed to solutions bearing multivalent cations, very powerful high capacity sequestration agents would result. In commonly assigned U.S. Pat. No. 5,948,383 (Kuznicki, et. al.) such a situation was created by isolating and stabilizing substantial concentrations of such charged silicate species within zeolite cages where ions such as calcium are free to enter from an aqueous environment (such as wash water) and react with these powerful sequestration agents. The zeolites of this patent have been characterized as hybrid zeolite-silica compositions (HZSC) which demonstrate unusual and beneficial properties in complexing multivalent cations. Such hybrid materials are prepared by crystallizing high aluminum zeolites in highly alkaline/high silica environments. Chemical analysis indicates an excess of silicate in these species beyond that inherent to their crystalline frameworks. Such materials demonstrate sequestration capacities for cations such as calcium which not only exceed the amount of zeolitic aluminum available for ion-exchange, but in fact, may exceed the theoretical limit possible for a zeolite. These materials and their properties must be considered something distinctly different than zeolitic. Such compositions show extreme promise as water softening agents and detergent builders and may find other applications in complexing multivalent cations such as in the removal of calcium from sugars and fatty oils or in removing heavy metal such as lead from various streams.

It is believed that the key mechanism in the effectiveness of these patented materials is derived from the ability of zeolite cages to isolate and stabilize much smaller, more highly charged silicate units than exist in normal aqueous solutions such as wash water. These silicate units are introduced during synthesis of said hybrid zeolite-silica compositions by providing an environment wherein silica in the reaction mixture is depolymerized to highly charged predominantly monomeric units before crystallization begins.

These occluded silicate units are readily visible in $^{29}$Si NMR spectra. Such units are much more powerful in complexing multivalent cations than existing silicate compositions used for that purpose. The zeolite framework and occluded silicate units act in concert, as a new type of hybrid composition, showing properties neither zeolites, silicates nor physical blends of the two demonstrate. In addition to high capacity, these new hybrid compositions demonstrate unusually rapid rates of sequestration, a critical parameter in applications such as detergent building.

It has now been discovered that the condition used to form the hybrid zeolite-silica compositions as described in U.S. Pat. No. 5,948,383, can yield novel zeolite particle morphologies. The zeolite particles which are formed are extremely rapid cationic sequestrants rendering the zeolite compositions useful, particularly as detergent builders. In the field of detergent building, rapid calcium sequestration is key to effective employment of surfactants. Commercial zeolite A suffers from slow exchange kinetics. This is especially true in the growing area of cold water detergents where the rate problem renders it essentially ineffective. While zeolite A, by definition, contains equimolar aluminum and silicon in its framework structure and thus the maximum possible zeolite ion-exchange capacity, useful ion-exchange capacity in most processes, however, is a dynamic function based on inherent capacity, ion selectively and kinetics of exchange. While zeolite A is a fixed composition with a fixed exchange capacity and fixed ion selectivities, the kinetics of exchange vary widely with the physical and morphological properties of zeolite A crystals and the aggregates into which they are formed. Microcrystalline zeolite A has long been known to improve exchange kinetics, but these submicron particles tend to stick to fabric in a wash cycle rendering such kinetically enhanced builders essentially unusable in real world detergent applications. Submicron microcrystals grown into macroscopic aggregates would solve this problem, yielding the kinetic advantages of microcrystalline exchangers and the handling/non-sticking properties of macroscopic ensembles.

SUMMARY OF THE INVENTION

It has now been found that uniform aggregates of submicron zeolite microcrystals can be formed by in situ processes where essentially all of the aggregrate material is between 1 and 5 microns. Surprisingly, even though such materials exist as macroscopic aggregates, the exchange kinetics are extraordinarily rapid, reflecting the inherent rate of the substituent submicron crystals. The advantages of maintaining the substituent crystals as coherent macroscopic aggregates is both in the ease of handling when used as a substituent in manufacturing compounds such as detergent mixtures, as well as in minimizing pressure drop in flow-through applications such as water purification/softening filters.

The enhanced properties of these macroscopic aggregates of submicron crystals is so striking in comparison to both individual submicron crystals and currently commercially employed multimicron crystal/aggregates that zeolites in this physical form may well be viewed as a new composition of matter. Zeolites including zeolite A, zeolite X and high aluminum analogs, as well as high aluminum analogs of gismondine, e.g. zeolite B, P and MAP, among others can be provided with the novel particulate morphology of this invention.

The synthesis of zeolite A has been well established owing to its wide employment as an ion-exchange agent, especially useful in water softening applications such as detergent building. With a Si/Al ratio of 1.00, the lowest possible for a zeolite according to the Rule of Lowenstein, high aluminum environments have generally been used in manufacture. The employment of a silica-enriched environment is counter-intuitive for the synthesis of such high aluminum materials. However, the employment of a silica-enriched environment instills several properties in a synthesis mixture. First, it allows the addition of substantial hydroxide and/or other electrolytes beyond that which would be applicable to a "normal" zeolite synthesis procedure. Such enhanced alkalinity/electrolyte levels are well known to promote the nucleation of zeolite seed crystals. Secondly, silica-enhanced environments promote retention of macroscopic particle integrity in the synthesis of aluminosilicates. These two properties, enhanced nucleation and retention of particle integrity, lead to the formation of massive numbers of submicron crystals of the zeolite forming as macroscopic aggregates, especially when a solid source of aluminum is employed, such as metakaolin and/or alumina.

The synthesis environment of the hybrid zeolite-silica compositions as described in aforementioned U.S. Pat. No. 5,948,383 has been found to promote the formation of aggregates of submicron HZSC crystals. Such compound aggregates manifest the rapid exchange properties of submicron crystals and the favorable handling properties of macroscopic aggregates. This favorable set of properties results from the high alkalinity of the HZSC synthesis mixture (versus comparable zeolite synthesis) in combination with the propensity of aggregates to retain mechanical integrity in silica-rich environments. It has been further discovered that the elevation of the electrolyte concentration in HZSC synthesis mixtures beyond that inherent to the caustic necessary for synthesis instills even more enhancement in the water softening properties of such materials. This elevation in electrolyte concentration may be accomplished by the addition of soluble salts to the synthesis mixture. Such salts include $Na_2CO_3$, TSPP, $Na_2B_4O_7$, as well as ordinary table salt (NaCl). Such salt addition causes the formation of smaller submicron crystals (as manifested by increased exterior surface area) without reduction of aggregate particle size (typically 1–5 microns). The superior water softening properties are especially observed in the enhanced rate of ion-exchange kinetics. This effect has been demonstrated for both zeolite P and zeolite A HZSC-analogs and is most likely applicable to other HZSC materials.

An additional advantage of the intentionally elevated electrolyte level in HZSC synthesis mixtures is in the enhanced rate of reaction during zeolite formation. As a consequence shortened reaction times and/or reduction in reaction temperatures, may favorably impact the economics of HZSC manufacture. While this effect has been demonstrated for HZSC, it is likely that it is directly applicable to classical zeolite synthesis. Thus, it would be expected that crystals of zeolite (for example zeolite A) grown at elevated electrolyte levels would be smaller than those grown under equivalent conditions without salt addition. For the synthesis of in situ zeolite particles, this might well result in an alternative means to prepare macroscopic aggregates of microcrystalline zeolites.

IN THE DRAWINGS

FIGS. 1A–1B micrographs of particles of commercial zeolite A and zeolite A particles of this invention as formed from Example 15, respectively.

FIG. 2 contrasts $^{29}Si$ NMR for "wet" and "dry" samples of a hybrid zeolite-silica composition as presented in Example 3. In this figure, the curve A is for "dried" zeolite and indicates the unit cell is tetragonal which shifts both peaks downfield. Curve B is for "wet" zeolite and shows the unit cell is pseudocubic which shifts both peaks upfield. The zeolite peak ratios stay constant during the shift. However, there is always extra intensity present at –81 to –85 ppm, indicating a nonzeolitic component at that frequency consisting of 5–15% of the total $^{29}Si$ NMR signal.

FIG. 3 presents comparative $^{29}Si$ NMR tracings of various zeolites and hybrid zeolite/silica compositions (HZSC). In this figure, A is the tracing of a gismondine type composition prepared in Example 2 and represents a prior art zeolite P prepared from metakaolin (COH). B&C are $^{29}Si$ NMRs of the HZSC products (Examples 3 and 10, respectively). D is the $^{29}Si$ NMR of zeolite A.

Figure 6:
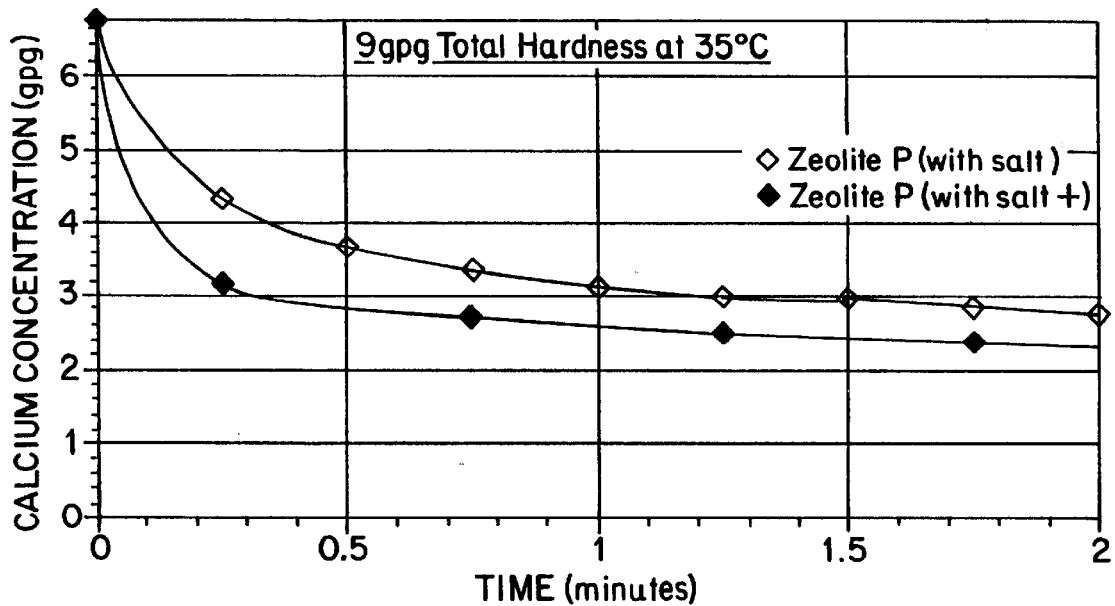

FIG. 6 is a graph of a calcium sequestration rate test comparing calcium removal between two zeolite P-based compositions, both of which have been prepared by the inventive process and have the novel particle morphologies of this invention, in which both zeolite P-based compositions have been prepared with added electrolyte in which one of the compositions was prepared with more added salt then the other.

Figure 7:
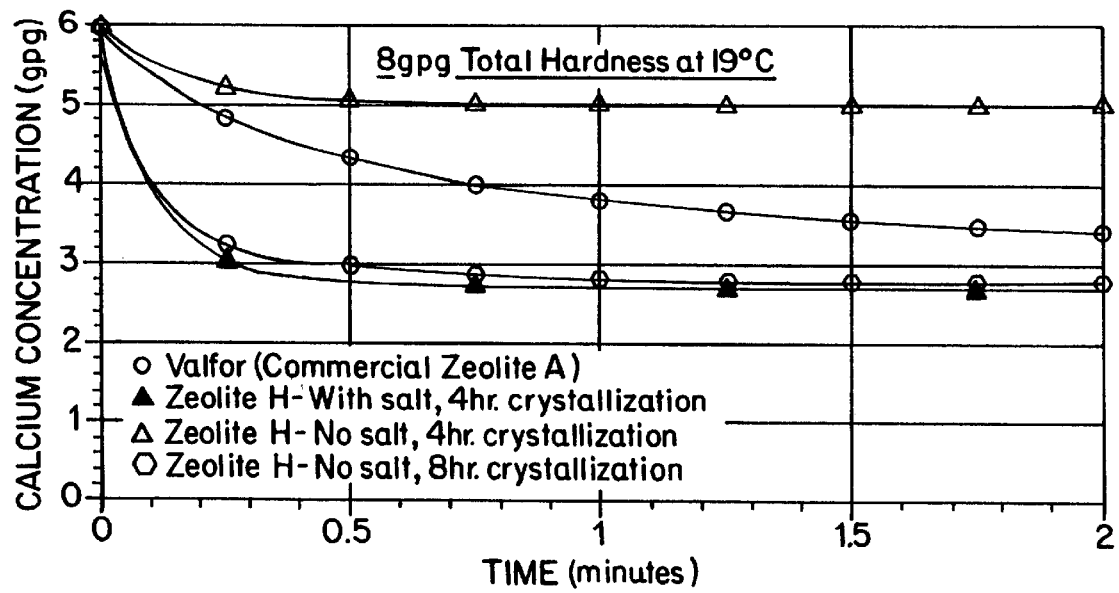

FIG. 7 is a graph of a calcium sequestration rate test comparing calcium removal between a commercial zeolite A with zeolite A-based compositions prepared using various operating parameters, including parameters of this invention.

DETAILED DESCRIPTION OF THIS INVENTION

Compositions of the invention can be prepared by processes disclosed in aforementioned U.S. Pat. No. 5,948,383, the entire contents of which is herein incorporated by reference. Such processes are directed to forming high aluminum zeolites surprisingly from reaction environments containing excess silica. High aluminum zeolites, in general, are defined as having a Si/Al≦1.1. Conversely, excess silica in the reaction mixture is herein defined as having a Si/Al≧1.1. The zeolites of this invention are provided with the desired novel morphology by reacting a finely divided aluminum source such as a dried aluminosilicate gel or powdered gibbsite and, more preferably, solid clays such as finely divided metakaolin or even raw kaolin with concentrated silicate solutions at pH values above 12 at temperatures ranging from about ambient to about 100° C. and at atmospheric pressure. The high silica reaction environment also suppresses the formation of iron oxide, probably by the formation of uncolored iron silicate. This allows "white" zeolites to be grown from natural reactants such as clays. The ability to use raw reactants such as uncalcined kaolin may substantively impact the economics of zeolite production.

It is crucial for the preparation of certain zeolites having the novel morphologies of this invention that the aluminum source must be added last to the reaction mixture. Thus, if all the ingredients of the reaction mixture are added together and heated to crystallization temperature, a conventional zeolite of the prior art will be formed. The novel materials of this invention will not be formed. It is even more desirable to prepare the novel compositions of this invention by heating the reaction mixture at temperatures of from 50° C. to 85° C. before the addition of the aluminum source for a period of time of about 30 minutes or longer. The reaction medium also includes an excess of an alkaline source. The term "excess" herein means that the amount of alkaline is greater than that commonly used in the synthesis of the specific zeolite sieve being prepared.

The process conditions as described above containing high levels of silica and excess alkaline surprisingly form high aluminum zeolites. Such zeolites contain occluded silicate and have been characterized as hybrid-zeolite silica compositions in commonly assigned U.S. Pat. Nos. 5,942,207 and 5,948,383. These hybrid zeolite-silica compositions have extraordinary capacity to complex multivalent cations such as calcium.

While not wishing to be bound by any theory of operation of how high aluminum zeolites can be formed from high silica reaction environments, it appears that the large silica content retards aluminum polymerization while the high alkalinity prevents silica polymerization. The result is the formation of 1:1 Si/Al chains. Moreover, heating the reaction mixture for a period of time (for example 30 minutes) prior to aluminum addition allows the silicate to depolymerize and form predominantly occluded silicate units contained within the pores of the zeolite. These small, highly charged silicate fragments are believed to yield the drastically improved sequestering properties of the hybrid zeolite silica compositions.

It has now been found that the high silica, high alkalinity reaction environments used for producing high aluminum zeolites also produces drastic changes in the morphology of the zeolite particles which are formed. The reaction medium results in nucleation effects which minimize individual crystal sizes without concomitant reduction in overall zeolite particle or aggregate formation. The morphology of the zeolite particles is believed to result in vastly improved rates of cation sequestration without disadvantageously altering particle size.

Figure 1A:
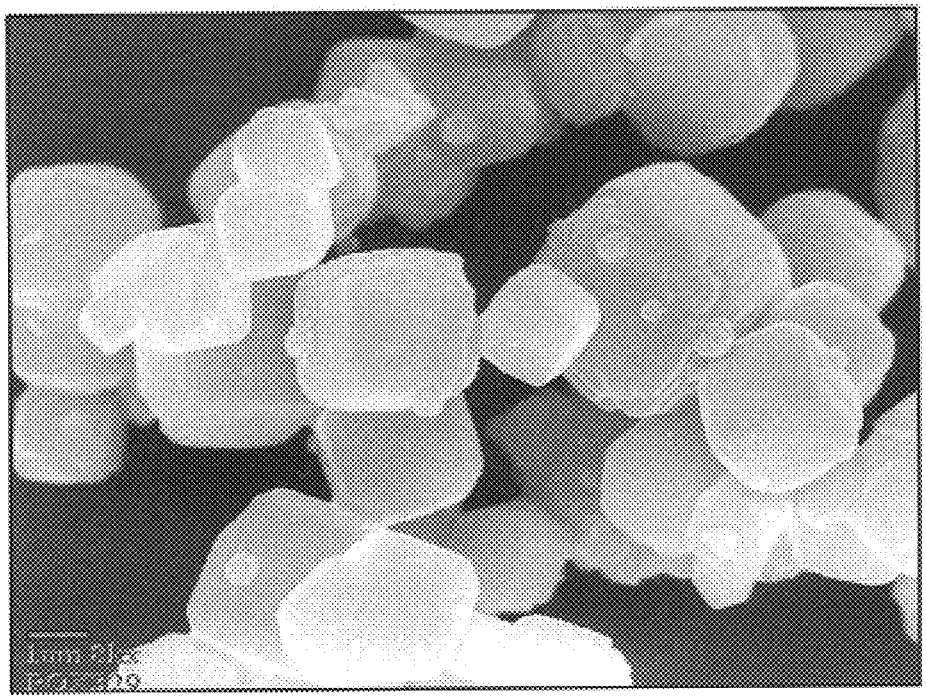
Figure 1B:
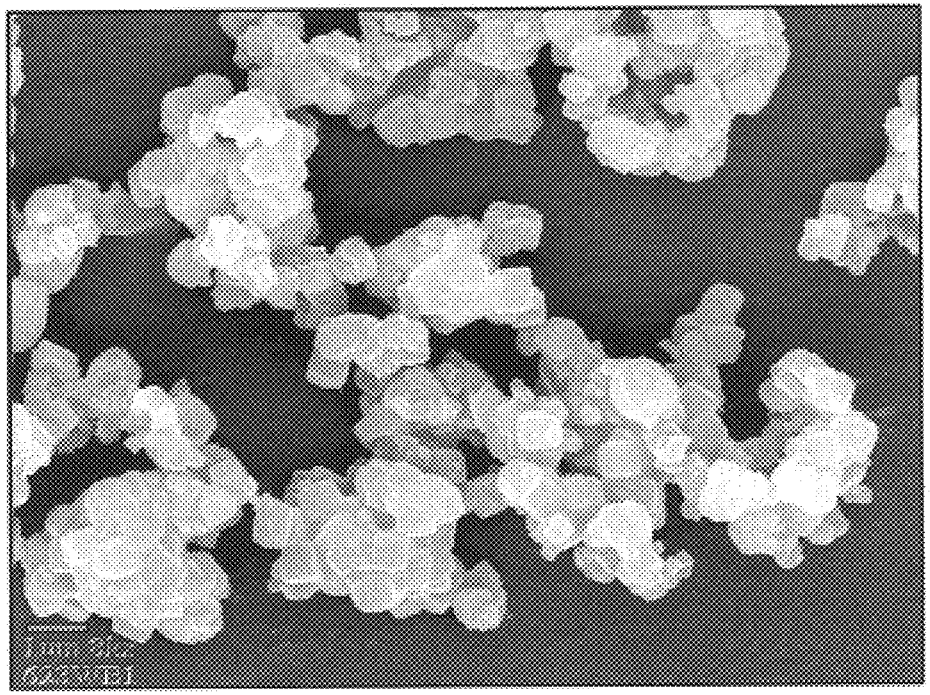

The zeolite particles with novel morphology of this invention can be seen in FIG. 1B and compared with a conventional zeolite particle in FIG. 1A. FIG. 1A is a micrograph of a commercial zeolite A in which each zeolite crystal is about 1–5 microns. FIG. 1B is also a micrograph of zeolite A-based particles which have been formed using the high silica, high alkalinity environments in accordance with this invention (Example 15). The zeolite shown in FIG. 1B was formed using metakaolin as the aluminum source. The zeolite particles as shown in FIG. 1B comprise macroscopic aggregates of zeolite microcrystals. Each aggregate is formed in-situ and has a size of about 1–5 microns similar to the size of the individual crystals of the commercial zeolite A. However, each aggregate as shown in FIG. 1B is formed of a multiple of submicron zeolite crystals each having a size of from about 0.05 to 0.5 micron. The submicron crystals grown into macroscopic aggregates yield the kinetic advantages of microcrystalline exchange and the handling and non-sticking properties of the larger size particles. The outstanding cation sequestration rates found with the zeolites and HZSC analogs of this invention are shown below in the examples.

The novel zeolite aggregates of microcrystals have a considerably higher surface area than conventional zeolite macrocrystals. Typical surface areas (BET) of at least 10 m$^2$/g, and preferably 40 m$^2$/g and higher are found with the novel zeolites and HZSC analogs of this invention. This compares with surface areas of less than 5 m$^2$/g of conventionally prepared and commercial zeolites such as A. The improvement in sequestration rates found with the aggregates of microcrystalline zeolites and HZSC analogs of this invention is also believed due to the higher level of large pore volume of these materials relative to conventionally prepared zeolites. The zeolites of novel morphology have a pore volume of greater than 0.01 cm$^3$/gm, preferably at least 0.04 cm$^3$/gm, among pores having greater than a 200 angstrom radius. This higher pore volume among the larger pores results in a higher carrying capacity for surfactants and other detergent adjuvants and renders the zeolites of novel morphology very useful as a detergent builder and processing aid. Please see Table 1 below which illustrates the differences between commercial zeolite A and zeolite A-based materials having the novel morphologies of this invention.

TABLE 1

| Zeolite A-based Samples Analytical Characteristics | | | |
|---|---|---|---|
| | Commercial Zeolite A Valfor 100 (from PQ Corp.) | Example 15 | U.S. Pat. No. 5,948,393 Example 10 |
| surface area (BET) m$^2$/g | 2 | 10–50 | 20+ |
| Si/Al (wet chem) | 0.99 | 1.03–1.07 | 1.09 |
| SEM crystal size (microns) | 2 | 0.5 | 0.25 |

TABLE 1-continued

Zeolite A-based Samples Analytical Characteristics

| | Commercial Zeolite A Valfor 100 (from PQ Corp.) | Example 15 | U.S. Pat. No. 5,948,393 Example 10 |
|---|---|---|---|
| median aggregate particle size (microns) | 5 | 3 | 8 |
| macro pore volume (30–1200 Å radius) | 0.008 | 0.04 | 0.17 |

The zeolite compositions of this invention include zeolitic molecular sieves that have a high $Al_2O_3/SiO_2$ molar ratio, e.g., $SiO_2/Al_2O_3$ molar ratios of 3 or below, preferably in the range of 2 to 3. Zeolitic species which can be produced by the methods of this invention and be formed into macroscopic aggregates of microcrystalline zeolites include type P (also referred to as type B), zeolite A, faujasite type such as high alumina X types, chabazite analogs and mixtures thereof and their HZSC analogs. As previously described, the procedure for making the high aluminum zeolites and HZSC analogs of this invention involves the use of the counter-intuitive high silica, i.e. $Si/Al \geq 1.1$, reaction medium which also includes an excessive alkalinity content beyond what has traditionally been used to form the desired zeolites. Importantly, the aluminum source needs to be added last to the reaction mixture. Advantageously, it has been found that a variety of aluminum sources, including solid sources, can be used to form zeolites having the novel morphologies of this invention. Such sources include dried silica-alumina gels, alumina, alumina-containing minerals (gibbsite) and clays such as calcined kaolin and even raw uncalcined kaolin, offering possible significant economic advantages in zeolite production.

After crystallization, the zeolite crystals are washed thoroughly with water, preferably deionized water, to remove sodium and spurious silica from the crystal surfaces. In some cases, some replacement of sodium by hydrogen may take place during washing. The crystals can be washed with solutions other than those of pure water. Up to about 40% by weight of the silica content of the washed crystals is due to the occluded silicate species. Usually up to about 20% by weight of the silica content of the zeolite will be occluded silicate. Thus, the total $SiO_2$ analysis as determined by conventional chemical analytic means exceeds that of the $SiO_2$ that would be expected based on the framework silica content as indicated by x-ray powder patterns and $^{29}Si$ NMR analysis of the composition. The occluded silicate portion of this silica is readily ascertained from the $^{29}Si$ NMR peaks at about −81 to −85 ppm.

$^{29}Si$ NMR has become a standard technique in the analysis of zeolites and related materials. The utility of this technique is based on the fact that different frequencies correspond to different electronic environments around the silicon, typically affected in zeolites by the chemistry of neighboring atoms and/or Si—O bond angles. It detects all silicon species present, not just those associated with long range crystallinity. This makes it sensitive to species that may not be detected by XRD.

The zeolite compositions which contain up to 40 wt. % of the total silica as occluded non-zeolite framework silicate have been characterized as hybrid zeolite-silica compositions in commonly assigned U.S. Pat. Nos. 5,942,207 and 5,948,383 and have shown an outstanding capacity to complex multivalent cations. Such ability renders these hybrid zeolite-silica compositions extremely useful as builders for laundry detergents. According to these patents, the non-zeolite occluded silicate in amounts of 5 to 40 wt. % relative to the silica content of the composition is important in achieving the added sequestering ability of the composition.

It has now been found that the morphology of the zeolite and analagous HZSC compositions produced from the high silica, high alkaline reaction medium is highly determinative in providing the zeolite with vastly improved sequestration capabilities, in particular, in the rate of sequestration. Rapid calcium sequestration is most important to effective employment of surfactants in detergent building. As will be shown below, the macrocrystalline aggregates of microcrystalline zeolites of this invention can rapidly complex with multivalent cations such as calcium. Accordingly, after crystallization from the high silica, high alkaline reaction medium, the zeolites can be washed to remove sodium and spurious silica from the crystal surfaces to provide a non-zeolite silicate content of up to 40 wt. % of the total silica present in the composition, but preferably to a level of less than 20 wt. %, and, more preferably, to a non-zeolite silicate content of 5 wt. % or less to yield zeolite compositions showing vastly improved rates of sequestration. It has been found that zeolites of this invention having the novel morphology and containing higher levels of occluded silicate have increased sequestration capacity, while reduced occluded silicate levels in the zeolite have a profound effect on sequestration rates, so long as the novel zeolite morphology is present.

Preferably, the compositions of the zeolitic molecular sieves and occluded silicate may be represented by the molar formula:

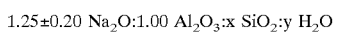

$$1.25 \pm 0.20\ Na_2O : 1.00\ Al_2O_3 : x\ SiO_2 : y\ H_2O$$

wherein x is 2.05 to 2.90 in the case of zeolite B;

x is 2.05 to 2.90 in the case of zeolite A;

x is 2.05 to 2.90 in the case of faujasite;

x is 2.05 to 2.90 in the case of chabazite; and y is 0–20.

It must be noted that $Na_2O$ may be exchanged from such materials by extensive washing and falsely low cation readings may be obtained.

The compositions contain up to about 40% by weight of the $SiO_2$ of x as non-zeolitic silicate detectable by $^{29}Si$ NMR, the occluded silicate being predominately within the crystals of said molecular sieve. The compositions preferably contain less than 20% by weight, and more preferably, equal to or less than 5% by weight of $SiO_2$ of x as non-zeolite silicate if faster sequestration rates are desired over complexing capacity.

In another aspect of the present invention, it has been found that the zeolites formed by the processes of this invention and having the novel morphology and including HZSC materials can be provided with improved sequestration rates by elevating the electrolyte concentration in the synthesis mixtures beyond that inherent to the caustic necessary for synthesis. In this aspect of the invention, the high silica, high alkaline environment is further provided with an additional electrolyte concentration. Such electrolytes can be salts selected from among the group consisting of nitrates, phosphates, bicarbonates, carbonates, borates, nitrites, sulphates, chlorides, etc. Specific non-limiting examples include sodium carbonate, trisodium polyphosphate (TSPP), sodium borate as well as sodium chloride among others. The salt additions presumably result in the formation of smaller submicron crystals as the zeolite crystals grow around the salt nucleation sites. As the level of salt increases, the number of nucleation sites increase and the size of the individual crystals becomes smaller. The level of added salt or electrolyte into the reaction mixture can vary widely. However, it has been found that amounts of electrolyte corresponding to about 10% to about 100% by weight based on the aluminum-containing reactant yields the increased reaction rate and improvement in surface area of the zeolite which corresponds to the reduction in individual zeolite crystal size. Importantly, it has been found that while the size of the individual submicron crystals becomes smaller, this does not result in any reduction of in-situ aggregate particle size which remains typically between 1 to 5 microns. These aggregates containing the smaller submicron crystals of the zeolite have shown improved hardness sequestration rates. Important also, it has been found that the added electrolytes are not occluded into the zeolite framework as is the excess silica.

An additional advantage of intentionally elevating the electrolyte level in the zeolite synthesis mixtures in accordance with this invention is an enhanced rate of zeolite crystal and aggregate formation. Accordingly, the reaction time can be shortened or the reaction temperature can be reduced, both of which favorably impact on the economics of zeolite manufacture. While this effect has been demonstrated for the high silica, high alkaline environments used to make zeolites in the process of this invention, it is likely that the elevated electrolyte content would be directly applicable to classical zeolite synthesis. Thus, it would be expected that crystals of zeolite grown at elevated electrolyte levels would be smaller than those grown under equivalent conditions without salt addition. For the synthesis of in-situ zeolite particles, this might well result in an alternative means to prepare macroscopic aggregates of microcrystalline zeolites without the need for the high silica, high alkaline environments.

Hybrid zeolite-silica compositions were prepared and contrasted to high aluminum zeolite and silica standards. The following examples also illustrate the improved sequestration capacities and rates found with the zeolite and HZSC analog compositions of this invention.

EXAMPLE 1

High aluminum versions of gismondine, sometimes referred to as Zeolite MAP, are the newest manifestation of high aluminum zeolite detergent builders. In order to produce zeolite MAP, Example 2 of U.S. Pat. No. 5,512,266 was replicated by the following procedure:

A sodium aluminate solution (containing 20% $Al_2O_3$, 20% $Na_2O$ and 60% $H_2O$) was prepared by dissolving 32.2 grams of sodium aluminate and 10.1 grams of NaOH in 57.5 grams of deionized water. This solution was then combined with 26.4 grams of NaOH and 264.3 grams of deionized water and placed in a constant temperature bath at 950° C. A sodium silicate solution was prepared by dissolving 109.6 grams of N-Brand® sodium silicate (containing 29.0% $SiO_2$, 9% $Na_2O$ and 62% $H_2O$) with 2.8 grams NaOH and 264.3 grams deionized $H_2O$. This solution was also brought to 950° C. in the constant temperature bath. The silicate solution was slowly added to the aluminate solution and vigorously stirred. The resultant gel was crystallized at 95° C. for five hours, following which the resultant crystals were filtered and washed with two lots of 500-ml deionized water. The crystalline product was dried in a forced air oven at 100° C. overnight. The crystalline product was analyzed and found to have a gross chemical Si/Al molar ratio of approximately 1.13 ($SiO_2/Al_2O_3=2.26$). The characteristic XRD powder pattern was as described in U.S. Pat. No. 5,512,266. This material will hereafter be referred to as MAP.

EXAMPLE 2

High aluminum versions of gismondine have long been known to demonstrate high ion-exchange capacities. In order to prepare a high aluminum analog of this mineral, Example I C of U.S. Pat. No. 3,112,176 was replicated by the following procedure:

10.0 grams of pulverized Metamax® metakaolin supplied by Engelhard Corporation was slurried in 100.0 grams of deionized water. To this slurry was added a solution of 10.6 grams of NaOH dissolved in 20.0 grams of deionized water. This mixture was crystallized at 102° C. in a stirred autoclave for 50 hours. The crystalline product of the reaction was filtered and washed with two 500-ml lots of deionized water. The crystalline product was dried in a forced air oven at 100° C. overnight. The crystalline product was analyzed and found to have a gross chemical Si/Al molar ratio approaching 1.00 ($SiO_2/Al_2O_3=2.00$) The characteristic XRD powder pattern was as described in U.S. Pat. No. 3,112,176 and was essentially indistinguishable from that described in U.S. Pat. No. 5,512,266. This material will hereafter be referred to as COH (Composition Of Haden).

EXAMPLE 3

In order to prepare a Hybrid Zeolite-Silica Composition, the following procedure was applied:

1000 grams of fine particle size metakaolin obtained by calcining an ultrafine mechanically delaminated ground hydrous kaolin (90% by weight finer than 1 micron, e.s.d.), followed by pulverization, as described in U.S. Pat. No. 5,948,383, was used. The powdered metakaolin was blended into an alkaline silicate solution containing 702 grams of N-Brand® sodium silicate solution and 1064 grams of NaOH in 4800 grams of deionized water which had been mixed and preheated to 72° C. The mixture was then reacted under vigorous stirring at 72° C. for eight hours at ambient pressure in an open stainless steel vessel. The crystalline product of the reaction was filtered and washed three times with 2000-ml lots of 72° C. deionized water. The crystalline product was dried in a forced air oven at 100° C. overnight. The crystalline product was analyzed and found to have a gross chemical Si/Al molar ratio of approximately 1.15 ($SiO_2/Al_2O_3=2.30$). An XRD powder pattern essentially identical to that of Example 1 and 2 (characteristic of gismondine type zeolites) was obtained. This material will hereafter be referred to as an HZSC (Hybrid Zeolite Silica Composition).

Additionally, the sodium content of this material as synthesized was found to be essentially equal to that of the silica (Na/Si=1.01), and to be substantially above the aluminum content on a molar basis (Na/Al=1.16). Generally, the aluminum content of a zeolite is expected to equal its cationic content in that each framework aluminum induces one net negative framework charge which is counterbalanced by cations in order to maintain electronic neutrality. This extra sodium is a characteristic of HZSC and is believed to be the result of sodium in association with the occluded silicate species.

The average particle size (50% by weight finer than) of the crystalline product was 5.5 microns as determined by a Sedigraph® 5100.

EXAMPLE 4

As a preliminary assessment of water softening ability, a "calcium binding test" as described by Henkel (GB 1473

201) was conducted using the following procedure: In a Waring® blender mixer containing 1 liter of an aqueous solution of 0.594 g of $CaCl_2$ (equivalent to 300 mg of CaO per liter) adjusted to pH 10 with dilute NaOH, 1.0 gram of the test sequestrant (air equilibrated) was added. The sample was vigorously stirred by setting the Waring® blender to low speed for 15 minutes. After this period, the aluminosilicate was filtered off and the residual hardness (x) in mg CaO/liter was determined using a calcium ion selective electrode. The calcium binding capacity was then calculated from the formula: Calcium binding capacity=300-x. The theoretical maximum binding capacity for a zeolite in this test is 197 mg CaO/g anhydrous zeolite. The results for the crystalline products of Examples 1, 2 and 3 in this test are listed below as Table 2.

TABLE 2

"Calcium Binding Capacities" of Test Sequestrants

| Example 1 | MAP (as per Example 2 U.S. Pat. No. 4,605,509) | 163 mg CaO |
|---|---|---|
| Example 2 | COH (as per Example 1C U.S. Pat. No. 3,112,176) | 169 mg Cao |
| Example 3 | HZSC (as per this invention) | 197 mg CaO |

The binding capacity of MAP and COH were exactly what would be expected from data contained in Column 6, lines 21 through 24 of U.S. Pat. No. 5,512,266 for hydrous P-type zeolites with Si/Al molar ratios of 1.00 and 1.13 respectively. The COH calcium binding capacity is slightly higher than that of the MAP, probably because of its slightly greater aluminum content. The 197 mg reading for the HZSC is extremely unexpected in that this was a fully hydrated sample containing 10–15 weight % water and thus the anhydrous capacity would appear to exceed the theoretical limit for a zeolite. In order to establish its full sequestration capacity, an additional test was performed.

EXAMPLE 5

The full sequestration capacity of the crystalline product of Example 3 (HZSC) at pH 10 (typical of wash water) was established by exchanging 3.0 grams of the material twice with 6.0 grams of $CaCl_2.2H_2O$ dissolved in 400 ml deionized water. The exchanges were each conducted for approximately 45 minutes at a temperature of 100° C. The sample was filtered and washed six times with approximately 100 cc deionized water to remove any spurious $CaCl_2$. The sample was then dried at 100° C. for approximately 12 hours. The sample was then subjected to conventional X-ray fluorescence chemical analysis techniques. The analysis revealed 23.5 weight % CaO, 42.0 weight % $SiO_2$, 31.9 weight % $Al_2O_3$ and approximately 1.0% other materials on a dry weight basis. Thus, the material contained 7.0 meq/g Si, 6.26 meq/g Al and 8.37 meq/g Ca. Not only does this indicate 34% more calcium than can be accounted for by exchange with the available aluminum, it is nearly 20% greater than the 7.0 meq capacity theoretically possible for ion-exchange into a maximum aluminum zeolite. In terms of mg CaO/g anhydrous zeolite (as in the Henkel test) this is a capacity of 236, well above the theoretical zeolite maximum of 197. Clearly, zeolite ion-exchange is not the only sequestration mechanism operating for the HZSC of Example 3.

EXAMPLE 6

Figure 2:
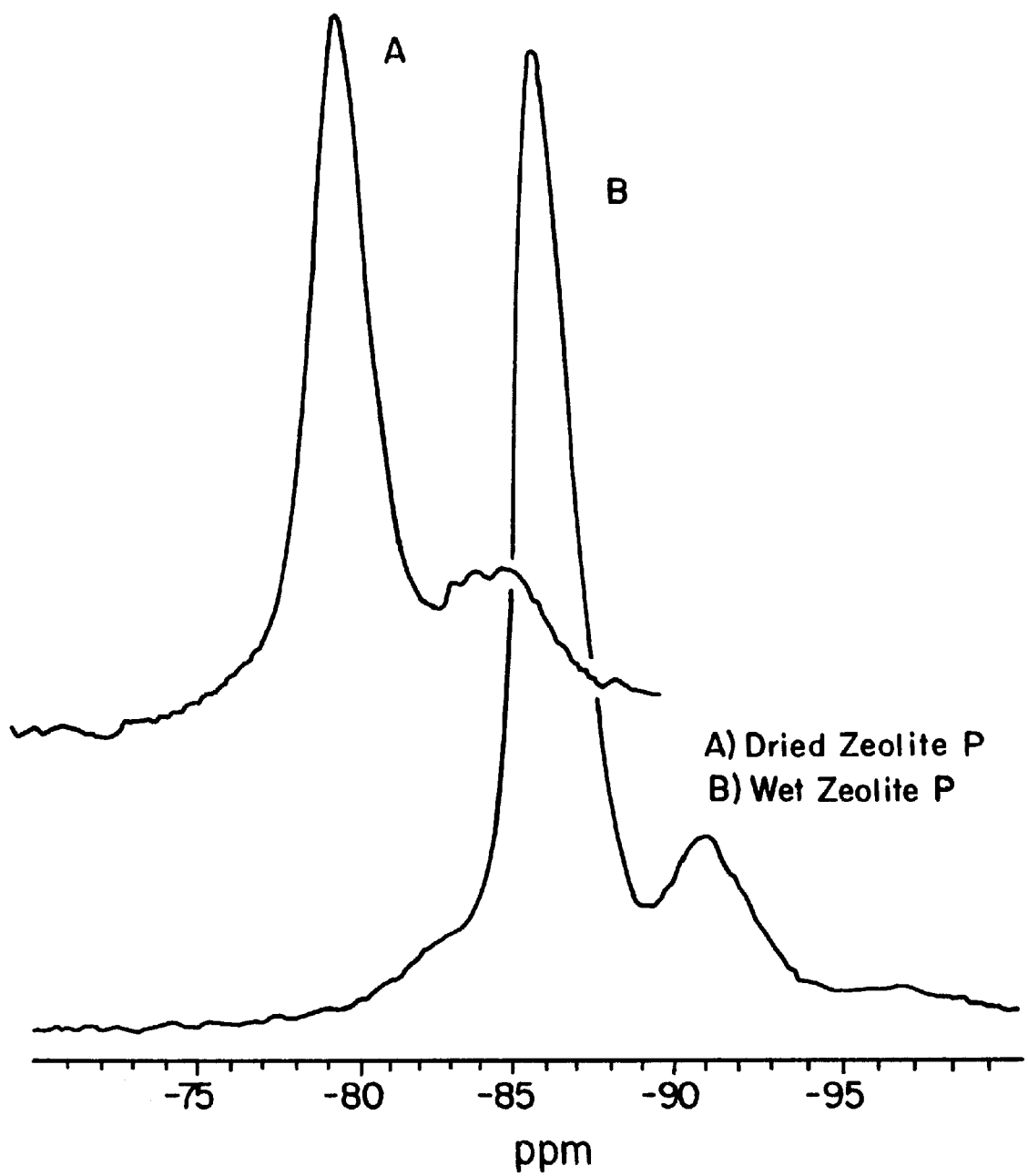

Since calcium, silica and alumina were the only significant species present in the fully loaded sample of Example 5, and since the calcium content was much greater than could be accounted for by aluminum induced ion-exchange, the hypothesis was advanced that some of the silica was in an active form and had bound additional calcium. In order to assess if non-zeolitic silica were present, a sample of the air equilibrated HZSC of Example 3 was subjected to silicon NMR. A spectrum was obtained with two zeolitic peaks at -86.5 and -91.1 ppm respectively. The peak at -86.5 ppm had a clear shoulder at its front indicating an additional peak at -81 to -85 ppm (see FIG. 2). P-type zeolites are well known to reversibly distort from pseudocubic to tetragonal unit cell symmetry upon drying, typically near 100° C. When the HZSC was dehydrated and reexamined by silicon $^{29}Si$ NMR, the tetragonal unit cell material now showed its strongest peak downshifted to -79.7 ppm and a second very asymmetric peak at circa -81 to -85 ppm which appeared to be a composite of the secondary MAP zeolite peak downshifting and the unidentified peak previously seen at -81 to -85 ppm as a shoulder to the major zeolitic peak. Comparison of the relative intensities of the zeolitic peaks in wet and dry states indicates that this peak at -81 to -85 ppm, which does not shift with the zeolitic silica, accounts for approximately 10–15% of the total silicon of the sample. Comparison to the gross elemental analysis indicates that 1.0 to 1.5 calciums would therefore be complexed per additional silicon for an exchange at pH 10. In other words, each of the non-framework silicons bear two to three exchangeable charges per silicate unit. This indicates a predominantly occluded silicate species. Such occluded silicate species cannot exist in the relatively neutral water of a wash solution, but apparently can exist stably within zeolite cages.

EXAMPLE 7

In order to assess the relative performance of an HZSC versus zeolite as a water softening agent in mixtures resembling wash water, sequestration tests were conducted in mixed calcium/magnesium solutions at 35° C. and pH 10. 1.5 liter charges of 1.03 molar calcium plus magnesium solutions were buffered with glycine solutions to a pH of 10. The Ca:Mg molar ratio was established at 3:1. The test hardness solutions were heated to 35° C. in a constant temperature bath at which point 0.45 gram charges of air equilibrated test sequestrants were added and the test mixtures agitated by an overhead stirrer at a rate of 200 rpm. Total hardness concentration was monitored by an Orion Model 9332BN total hardness electrode connected to an Orion Model 720A pH meter. Both the "instantaneous" and "equilibrium" hardness removal of a sequestrant can be critical parameters depending upon the particular environment in which they are employed. Hardness removal at 15 seconds was taken as indicative of "instantaneous" hardness removal and readings at 15 minutes were taken as a measurement of "equilibrium" properties.

The MAP of Example 1, the COH of Example 2 and the HZSC of Example 3 were subjected to this test and the results are s ummarized as Table 3.

TABLE 3

Timed Hardness Removal by Test Sequestrants

| Sample | Hardness Removed 15 seconds | Hardness Removed 15 Minutes |
|---|---|---|
| MAP (Example 1) | 18% | 55% |
| COH (Example 2) | 6% | 48% |
| HZSC (Example 3) | 48% | 82% |

This test indicates that the MAP of Example 1 is "instantaneously" faster than the COH of Example 2, but reaches a relatively similar "equilibrium." The HZSC of Example 3 behaves qualitatively differently, being both much more rapid than either zeolite sample and equilibrating at a much greater depth of hardness removal.

EXAMPLE 8

In order to ascertain whether physical mixtures of zeolite and silicate sequestrants could account for the extraordinary performance of the Hybrid Zeolite-Silica Composition of Example 3, a 90%/10% mixture of the MAP of Example 1 and SKS-6 state-of-the-art silica-based water softener was made and subjected to the test of Example 7. The 15 second and 15 minute hardness removal readings were 17% and 58% respectively, only trivially differing from the MAP sequestration results and not showing anything remotely resembling the superior performance of the hybrid composition.

EXAMPLE 9

In order to ascertain if other zeolite frameworks could be utilized to form Hybrid Zeolite-Silica Compositions, additional synthesis experiments were conducted. Zeolite A was selected because it is the "standard" of the detergent zeolite industry. Zeolite A was synthesized from metakaolin by the following procedure:

75.0 grams of pulverized Metamax® metakaolin was slurried in 750.0 grams of deionized water. To this slurry was added an NaOH solution prepared by dissolving 26.4 grams of NaOH in 150.0 grams of deionized water. The reaction mixture was crystallized in a stirred autoclave at 102° C. for 50 hours. The product was filtered and washed two times with 1000-ml lots of deionized water. The sample was then dried overnight in a forced air oven at 100° C. The product of this example demonstrated a strong, clean XRD powder pattern characteristic of Zeolite A. This material was then subjected to the hardness sequestration test of Example 7 and the 15 second and 15 minute hardness removal readings were 10% and 41% respectively.

EXAMPLE 10

In order to synthesize a Hybrid Zeolite-Silica Composition with Zeolite A as the zeolite framework component, a new HZSC material was prepared by the following procedure:

An alkaline silicate solution was prepared by dissolving 175.0 grams of NaOH and 99.0 grams of NBrand® sodium silicate in 522.8 grams deionized water. After mixing and preheating the mixture to 80° C., 109.5 grams Metamax® metakaolin was added and the mixture reacted by stirring for one hour at 80° C. in a constant temperature bath. The resultant product was filtered and washed three times with 1000-ml lots of deionized water. The sample was then dried overnight in a forced air oven at 100° C. The product of this example demonstrated a strong, clean XRD powder pattern characteristic of Zeolite A. This material was then subjected to the hardness sequestration test of Example 7 and the 15 second and 15 minute hardness removal readings were 43% and 5 1% respectively, showing that hardness sequestration was remarkably faster and substantially more thorough than that of the Zeolite A of the previous example. Clearly, the hybrid compositions offer substantial advantages over comparable zeolites in both rate and amount of hardness removal.

EXAMPLE 11

Figure 3:
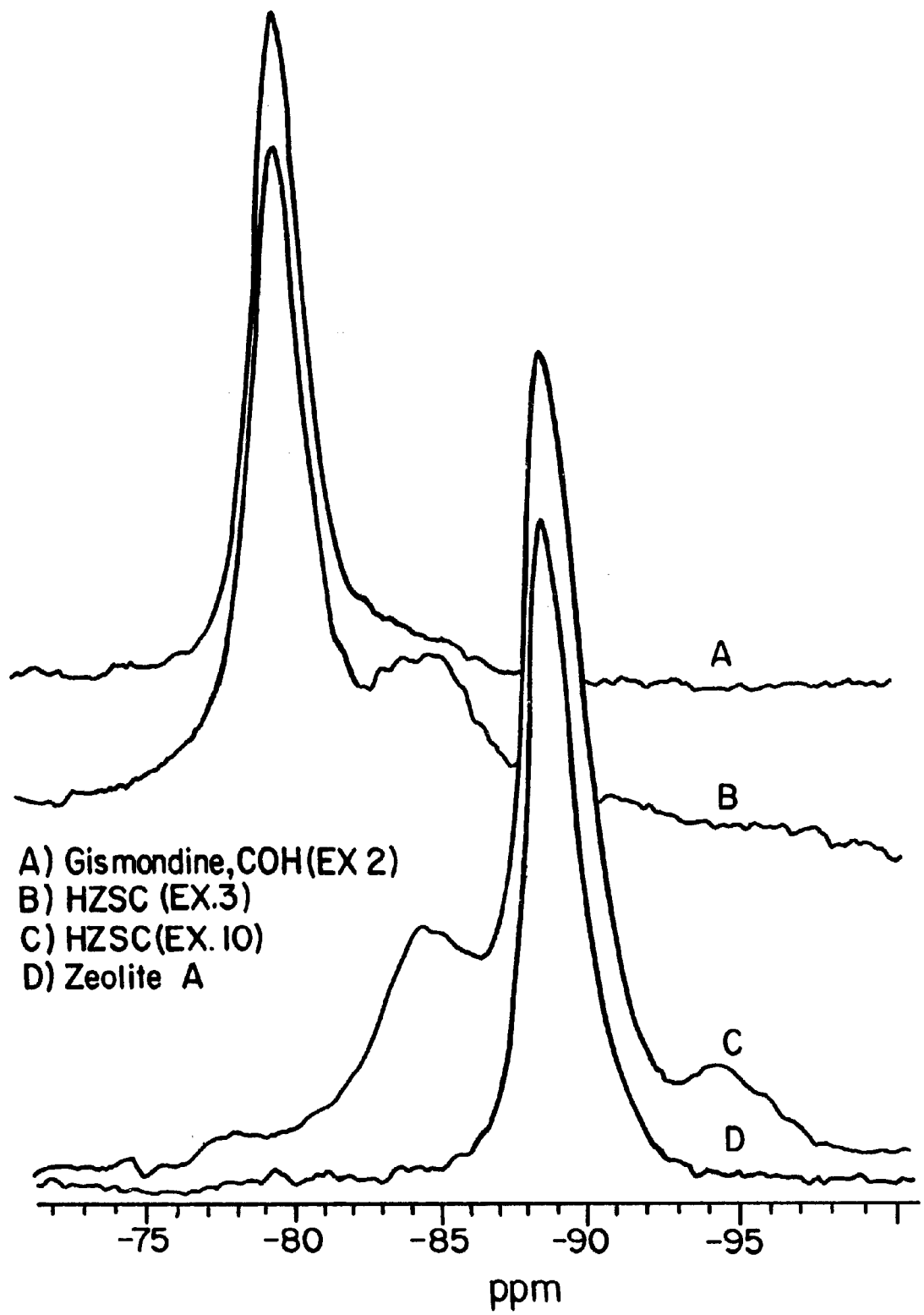

Zeolite A and the HZSC of Example 10 were subjected to $^{29}$Si NMR in order to assess the presence of occluded silicate species comparable to those of the HZSC of Example 3. Comparative NMR are presented as FIG. 3. Unlike gismondine-type materials, Zeolite A does not possess a peak in the region of –81 to –85 ppm and a comparison of Zeolite A to the HZSC of Example 10 clearly shows the occluded silicate species as is found in the HZSC of Example 3. The clear peak at –81 to –85 ppm. represents approximately 40% of the silica of the base Zeolite A structure and in fact, may be so high that it limited the "equilibrium" sequestration capacity of the material of Example 10 by physically filling many of the cavities.

EXAMPLE 12 (COMPARATIVE)

In initial scale-up efforts to make substantial quantities of HZSC equivalent to that of Example 3, 74.97 pounds of deionized water was combined with 42.7 pounds of 50% NaOH solution, 14.12 pounds of N-Brand® Sodium silicate and 20.0 pounds of Luminex® brand metakaolin and the resultant mixture was stirred and brought from ambient temperature to 72° C. in a 25-gallon stainless steel reactor. The mixture was crystallized under vigorous agitation for 8 hours at 72° C. and was subsequently washed and filtered on several large pan filters including multiple reslurries and rinses with substantial excesses of deionized water.

The powder XRD pattern for the product of this example was that of a highly crystalline material of gismondine-type structure, consistent with that of Example 3. However, the silicon NMR lacked the shoulder on the main –86.5 ppm peak which is indicative of the peak at –81 to –85 ppm associated with the non-crystalline occluded silicate of HZSC. Noting this lack of occluded silicate necessary to yield the enhanced calcium capacity noted for HZSC, an exhaustive calcium exchange was conducted in accordance with the procedure of Example 5. Analysis of the exhaustively exchanged sample yielded 18.5% CaO, 45.1% $SiO_2$ and 34.0% $Al_2O_3$ on a dry weight basis. Thus, the material contained approximately 7.50 meq/g Si, 6.67 meq/g Al and 6.60 meq/g Ca. The Ca/Al meq/g ratio approaching 1.0 is consistent with a high degree of exchange onto the aluminum sites of classical zeolite without the additional effect of the complexing silica. The calcium capacity of 6.0 meq/g is consistent with a classical zeolite at a Si/Al ratio of 1.10–1.15, and is not consistent with the above 7.0 meq/g loadings associated with HZSC's.

The product of this example was found to be a high aluminum version of Zeolite P and not an HZSC. This was surprising in that the reactants and their ratios, as well as the reaction time and temperature, for this example were identical to that of Example 3, albeit on a larger scale. In a search for differences between the method of preparation of this larger lot with apparently equivalent laboratory scale lots, an inconsistency was noted. In all successful HZSC's preparations water, caustic and silicate had been mixed and brought to crystallization temperature with addition of metakaolin as the last step. The hypothesis was advanced that depolymerization of silicate to form predominantly monomeric silicate units might be a necessary step before overall reaction began and that preparation of the highly alkaline silicate solution before reaction with the aluminum source might be required. With this working hypothesis the following example was conducted.

EXAMPLE 13

An identical mixture to that of Example 12 was prepared but in a different order of addition/reaction. 74.97 pounds of deionized water, 42.7 pounds of 50% NaOH solution and 14.12 pounds of N-brand® sodium silicate were combined and heated under agitation to 72° C. in the same 25-gallon stainless steel reactor of the previous example. After an equilibration period of 30 minutes to allow silicate depolymerization, 20.0 pounds of Luminex brand metakaolin was added and the mixture reacted under vigorous agitation for 8 hours at 72° C. After the reaction period, the product was subsequently washed and filtered on several large pan filters including multiple reslurries and rinses with substantial excess of deionized water.

The powder XRD pattern for this product was that of a highly crystalline material of a gismondine type structure, consistent with that of Example 12. However, unlike Example 12, the silicon NMR showed a clear shoulder to the main peak at −81 to −85 ppm which is characteristic of an HZSC. Additionally, elemental analysis indicated the characteristic elevated Si/Al ratio (Si/Al=1.20) and sodium levels approaching molar silicon contents (Na/Si=1.01) and the characteristic excess of sodium to aluminum on a molar basis (Na/Al=1.21).

With the NMR indication of occluded silicate, exhaustive calcium exchange was conducted as in Example 12. Analysis of the exhaustively exchanged sample yielded 23.8% CaO, 43.2% $SiO_2$ and 31.4% $Al_2O_3$ on a dry weight basis. Thus, the material contained approximately 7.20 meq/g Si, 6.16 meq/g Al and 8.49 meq/g Ca. The Ca/Al meq/g ratio approaching 1.4 is consistent with that of an HZSC and not consistent with that of a zeolite which is limited to 1.0 as noted in Example 12. The calcium capacity approaching 8.5 meq/g is consistent with an HZSC and inconsistent with the 7.0 meq/g theoretical limit noted for zeolites.

The product of this example was found to be an HZSC and not merely a high aluminum version of Zeolite P as prepared in Example 12 in spite of the fact that both were prepared using identical reactants, reaction times and temperatures and crystallization/washing equipment. It is therefore apparent that the order of reactant addition and probably full depolymerization of silicate are needed in the formation of HZSC.

EXAMPLE 14

In an attempt to demonstrate that aluminum sources other than metakaolin may be employed in the formation of HZSC, an aluminosilicate gel with gross composition approaching a 1:1 Si/Al was prepared by dissolving 2.95 kg of $NaAlO_2$ in 14.0 kg deionized water. To this was added 7.45 kg N-Brand® sodium silicate. The resultant gel was beaten to a homogeneous appearing consistency utilizing a high shear blade. The homogenized gel was poured into stainless steel pans and dried in an oven overnight at 100° C. A portion of this dried gel was pulverized and employed as an HZSC reactant. 89 grams of NaOH and 88 grams of N-Brand® sodium silicate were dissolved in 600 grams of deionized water and brought to a temperature of 72° C. under agitation. After equilibrating, 160 grams of the dried gel aluminosilicate reactant was added to the mixture under agitation and crystallized at 72° C. for 5.5 hours. The sample was washed and vacuum filtered with an excess of deionized water and dried at 100° C. overnight. The XRD powder pattern for this material was that of a highly crystalline gismondine-type structure consistent with that of the previous example. The silicon NMR spectrum showed a clear shoulder to the main peak at −81 to −85 ppm, characteristic of HZSC.

The HZSC material produced in accordance with this example was tested in accordance with the procedure set forth in Example 7.

The results obtained indicated that the material obtained by this example possessed the same rapid removal i.e. 48% in 15 seconds and 82% in 15 minutes as is possessed by the novel material of Example 3.

Thus, this example establishes that aluminum sources other than metakaolin may be employed in the synthesis of the novel silicate zeolite hybrid materials of this invention.

EXAMPLE 15

A zeolite A-based composition formed in accordance with this invention was made with the listed substituents.

| | |
|---|---|
| $H_2O$ | 467 grams |
| NaOH(s) | 266 grams |
| N-Brand ® silicate | 22 grams |
| Metakaolin | 125 grams |

All the materials were mixed together in a plastic jar except for the metakaolin. The mixer was set at high speed (2000 rpm) and run to dissolve and homogenize the substituents at 65° C. The metakaolin was then added and the mixture reacted for 8 hours. The product was filtered and washed four times and dried at 100° C. overnight. The dried product was declumped with a 020 screen/1 pass in a micro pulverizer mill from Micron Powder Systems. Chemical analysis showed a non-framework occluded silicate content of 5% relative to total silica present in the composition.

Figure 4:
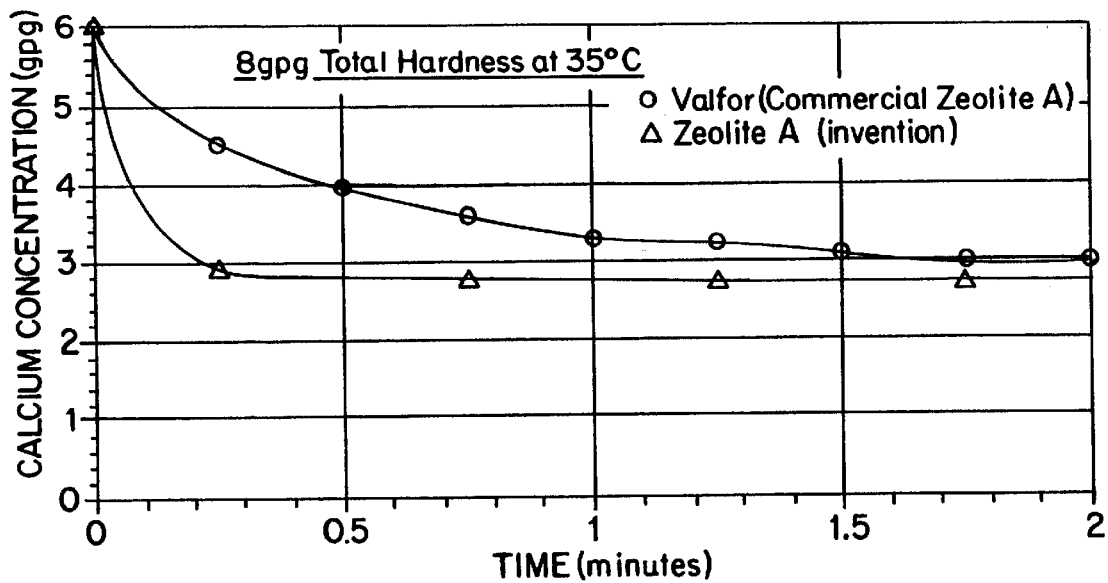
FIG. 4 is a graph of a calcium sequestration rate test comparing calcium removal between commercial zeolite A and a zeolite A-based composition having been prepared by the process of this invention and having the particle morphology of this invention.

This material was then subjected to the hardness sequestration test of Example 7 in which a charge of 1.37 molar calcium was used. For comparison, a commercial zeolite A (Valfor) was also tested. The results are shown in FIG. 4 which represents a graph of instantaneous hardness removal. At 15 seconds, only 2.9 grams per gallon of calcium remained (64% removed) using the zeolite A-based material of this invention compared with 4.46 gpg (44% removed) remaining relative to the commercial product. As can be seen from FIG. 4 the rate of hardness sequestration and removal is faster with the zeolite A-based material having the morphology of this invention.

At 3 minutes, hardness levels were about equivalent between the two materials. This result is not surprising as the lower level of occluded silicate in the inventive example would not result in a substantially greater sequestration capacity at "equilibrium" hardness removal. However, the morphology of the zeolites of this invention equates to substantially greater rates of sequestration.

EXAMPLE 16

A zeolite A-based material as formed in Example 15 was formed with the listed substituents and following procedure. In this Example, an added salt is incorporated into the reaction mixture.

| | |
|---|---|
| $H_2O$ | 467 grams |
| NaOH(s) | 266 grams |
| N-Brand ® | 22 grams |
| Metakaolin | 125 grams |
| Sodium Carbonate | 25 grams |

The above materials were mixed together in a plastic jar except for the metakaolin. The mixer was set at high speed (2000 rpm) and run at 65° C. to dissolve and homogenize the reactants. The metakaolin was subsequently added and the mixture allowed to react for four hours. The shortened time is possible because the salt (sodium carbonate) accelerates the reaction. The product was filtered and washed four times and dried at 100° C. overnight. The dried product was declumped with a 020 screen/1 pass in the micro pulverizer mill.

EXAMPLE 17

In this Example, zeolite A-based material within this invention is formed with an alternative aluminum source and added electrolyte.

| Part 1 | |
| --- | --- |
| $H_2O$ | 250 grams |
| NaOH(s) | 212 grams |
| Gibbsite (P5) | 87.5 grams |
| Part 2 | |
| $H_2O$ | 50 grams |
| N-Brand ® | 255 grams |
| Sodium Carbonate | 25 grams |

The materials in Part 1 were mixed together at high speed in a plastic jar. Part 2 was mixed similarly in a separate plastic jar. Both separated mixtures were subsequently allowed to react for four hours at 65° C. Part 2 was added to Part 1 and reacted for an additional two hours. The product was filtered and washed four times and dried at 100° C. overnight. The dried product was declumped with 020 screen/1 pass in the micro pulverizer mill.

EXAMPLE 18

A zeolite P-based material was formed with the substituents and procedure set forth below.

| $H_2O$ | 467 grams |
| --- | --- |
| NaOH(s) | 266 grams |
| N-Brand ® | 87.5 grams |
| Metakaolin | 125 grams |

All materials were mixed together in a plastic jar except for the metakaolin. The mixer was set at high speed (2000 rpm) and run at 62° C. to dissolve and homogenize the mixture. The metakaolin was added to the homogenized mixture and the mixture reacted for eight hours. The product was filtered and washed four times and dried at 100° C. overnight. Product clumping was removed with a 020 screen/1 pass in the micro pulverizer mill. XRD showed the product to be zeolite P-based. Chemical analysis showed an occluded silicate content of about 15% by weight of total silica present.

EXAMPLE 19

A zeolite P was formed as above with the exception that the silicate level was reduced and trisodium polyphosphate (TSPP) was added. The formulation is set forth below. The procedure followed that set forth in Example 18.

| $H_2O$ | 467 grams |
| --- | --- |
| NaOH(s) | 266 grams |
| N-Brand ® | 44 grams |
| Metakaolin | 125 grams |
| TSPP | 67 grams |

XRD showed a zeolite P-based product. Chemical analysis showed an occluded silicate content of about 10 wt. % based on total silica. No levels of occluded TSPP were found.

EXAMPLE 20

The same procedure as Example 19 was followed to form a zeolite P-based material. In this Example, sodium carbonate replaced the trisodium polyphosphate. The formulation is provided below.

| $H_2O$ | 467 grams |
| --- | --- |
| NaOH(s) | 266 grams |
| N-Brand ® | 44 grams |
| Metakaolin | 125 grams |
| $Na_2CO_3$ | 25 grams |

Chemical analysis did not find the presence of carbonate occlusion within the zeolite pores. As in Example 19 above, XRD confirmed the formation of a zeolite P-based material.

EXAMPLE 21

Example 19 was followed with the following formulation to make zeolite P-based material. In this Example, additional TSPP was added. The formulation is set forth below.

| $H_2O$ | 490 grams |
| --- | --- |
| NaOH(s) | 240 grams |
| N-Brand ® | 66 grams |
| TSPP | 100 grams |
| Metakaolin | 125 grams |

EXAMPLE 22

Figure 5:
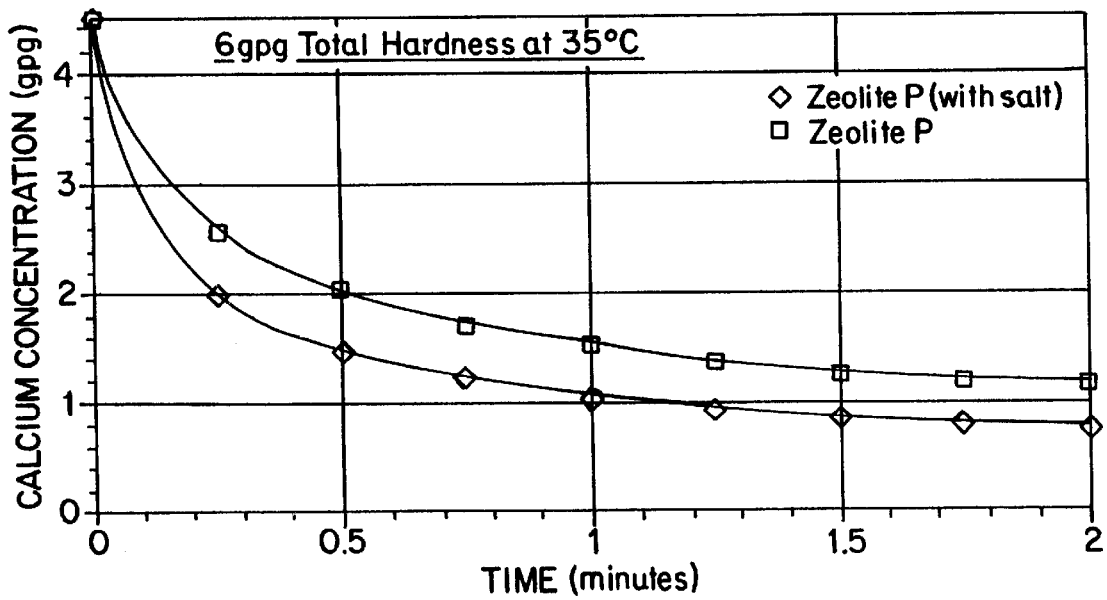
FIG. 5 is a graph of a calcium sequestration rate test comparing calcium removal between two zeolite-based compositions, both of which have been prepared by the inventive process and have the novel particle morphologies of this invention, but in which one of the zeolite P-based compositions have been prepared with added electrolyte.

In this Example, a comparison was made between the hardness sequestration rates of the zeolite P-based material of Example 18 and the zeolite P-based material of Example 19. The difference between the respective materials is that the material prepared in accordance with Example 19 included the added electrolyte trisodium polyphosphate. The hardness sequestration rate test was conducted as in Example 7 with a solution containing a calcium molar concentration of 1.03 or 6 grains per gallon. FIG. 5 graphs the results of calcium hardness removal using the respective materials.

As can be seen from FIG. 5, the material which was prepared with the salt addition had a faster instantaneous hardness removal relative to the zeolite P-based material which was formed without added salt. The difference in hardness removal remained steady from the instantaneous 15 seconds to the equilibrium hardness removal of 15 minutes. At 15 seconds, the zeolite P-based material formed with salt addition removed 67% of the calcium hardness whereas the zeolite P-based material which was formed without salt removed approximately 57% of the calcium hardness. At the equilibrium hardness removal time of 15 minutes, the zeolite P-based material formed with added salt removed 92% of the calcium hardness whereas the zeolite P-based material formed without salt removed 88%. These results indicate that the salt addition can affect not only the reaction kinetics in making zeolite, but actually have a profound effect on its properties. Again, it is believed that with the added electrolyte in the zeolite reaction medium, smaller microcrystalline zeolite-based particles are formed which enhance sequestration kinetics. At the same time, forming the zeolite with the added salt does not result in occlusion of the added salt and the aggregate particle size of the zeolite remains the same as the aggregate of the zeolite-based material which is formed without salt, approximately 1–5 microns.

EXAMPLE 23

Zeolite P-based material as prepared in Example 19 was compared with the zeolite P-based material of Example 21 to determine if additional amounts of added salt would further affect the sequestration performance of zeolite P. A hardness sequestration test was run as in Example 7 and the results are graphed in FIG. 6.

As can be seen from FIG. 6, the added salt effect similar to the previous Example is found. Thus, the calcium sequestration removal rate of the zeolite P-based material containing added salt is greater than the calcium sequestration removal rate of the zeolite P-based material which included salt but to a lesser degree. The instantaneous hardness removal at 15 seconds was 51% for the zeolite P-based material with salt addition, but was substantially higher at 65% for the zeolite P-based material which was formed with a higher electrolyte concentration. The difference between the rates was substantially maintained even at the equilibrium hardness removal level of 15 minutes wherein the zeolite P-based material formed with salt of Example 19 removed 75% of the calcium hardness whereas in the zeolite P-based material which was formed with added salt removed 81% of the calcium hardness. Again, it is believed that the additional salt creates more nucleation sites for the zeolite-based crystals which results in smaller submicron crystals. The zeolite-based particles which are formed are macrocrystalline particles of 1–5 microns size which contain the submicron crystals. Thus, the improved kinetics of sequestration with the smaller zeolite crystallites is advantageously achieved along with the ability to handle the zeolite particles which are formed into the larger aggregates.

EXAMPLE 24

A hardness removal test was conducted on a solution containing 8 grains per gallon calcium at a temperature of 19° C. which represents a colder temperature than was run with the previous Examples. Comparisons of sequestration performance was made between a commercial zeolite A, a zeolite A-based material as formed in Example 15, a zeolite A-based material as formed in Example 15 except that the reaction or crystallization time was only four hours instead of the eight hours of Example 15, and a zeolite A-based material which was formed as in Example 16 in which the zeolite A-based material was formed with salt addition and only a four hour crystallization time. FIG. 7 graphs the calcium hardness removal rate.

Referring to FIG. 7, it can be seen that the zeolite A-based material with salt addition and the zeolite A-based material which did not have salt addition, but which was crystallized a full eight hours showed substantial improvement in the instantaneous hardness removal rate relative to the commercial zeolite A. Further, it can be seen that the zeolite A-based material formed in accordance with the procedure of this invention and which did not include salt addition and which was crystallized for only four hours did not perform nearly as well as even the commercial zeolite A. This is believed to be caused by the fact that the small zeolite crystals did not have a sufficient time to form and that the aggregate particle had a morphology quite different than the effective zeolites. What this Example shows is that the zeolites of this invention with the novel morphologies can be quite effective as builders in cold water laundry detergents relative to commercial zeolite A materials, which have been ineffective in this regard.

The Examples demonstrate the preparation of a new class of materials which demonstrate remarkable speed and thoroughness of multivalent cation complexation. This is especially useful in water softening/detergent building applications. These properties appear to derive from the ability of zeolite cages to entrain and stabilize active, small, highly charged silicate species. The zeolite framework and entrained silicate units act in concert as a new type of hybrid composition showing properties that neither zeolites, silicates nor physical blends of the two demonstrate. This technology is undoubtedly expandable to both other zeolite basestocks and complexation processes beyond water softening. Importantly, it has been found that the rate of sequestration for multivalent cations can be improved even if only low levels of occluded silicate remains in the zeolite. The morphology of the zeolites produced appears to have a profound and advantageous effect on hardness removal. Thus, the aggregates of submicron particles which are formed have the advantageous complexing kinetics of the small submicron particles and the handling advantages of the 1–5 micron aggregates. While the zeolite-based materials of this invention are HZSCs, it is the morphology of the zeolite aggregate which is crucial to hardness removal performance. Thus, it is believed that all of the silica can be removed and sequestration rate enhanced over large crystal zeolites. It is useful to note that the presence of occluded silicate in the zeolite can be detected by $^{29}$Si NMR as a shoulder present in the −81 to −85 ppm.

Detergent compositions incorporating the zeolite materials of the present invention typically contain as essential components from about 0.5% to about 98% of a surfactant and from about 2% to about 99.5% of detergency builders including the zeolites having the novel morphologies of the present invention.

Typical laundry detergent compositions within the scope of the present invention contain from about 5% to about 30% of a surfactant and from about 5% to about 80% total detergency builder including the zeolites of this invention. Of this builder component from about 20% to 100% by weight of builder component can be the zeolites of the present invention with the balance of the builder component being optional known builders.

Detergent compositions herein may also contain from about 5% to 95% by weight of a wide variety of additional optional components. Such optional components can include, for example, additional detergent builders, chelating agents, enzymes, fabric whiteners and brighteners, sudsing control agents, solvents, hydrotropes, bleaching agents, bleach precursors, buffering agents, soil removal/anti-redeposition agents, soil release agents, fabric softening agents, perfumes, colorants and opacifiers. A number of these additional optional components are hereinafter described in greater detail.

The detergent compositions of this invention can be prepared in various solid physical forms.

The detergent compositions of this invention are particularly suitable for laundry use.

In a laundry method using the detergent composition of this invention, typical laundry wash water solutions comprise from about 0.1% to about 1% by weight of the zeolite builders of this invention.

The zeolite materials herein may also be employed as builders in laundry additive compositions. Laundry additive compositions of the present invention contain as essential components from about 2% to about 99.5% of the zeolite and further contains from about 0.5% to 98% by weight of a laundry adjuvant selected from the group consisting of surfactants, alternate builders, enzymes, fabric whiteners and brighteners, sudsing control agents, solvents, hydrotropes, bleaching agents, bleach precursors, buffering agents, soil removal/antideposition agents, soil release agents, fabric softening agents, perfumes, colorants, opacifiers and mixtures of these adjuvants. Such adjuvants, whether used in the detergent or laundry additive compositions herein, perform their expected functions in such compositions. A number of these adjuvants are described in greater detail as follows:

Surfactants

Various types of surfactants can be used in the detergent or laundry additive compositions of this invention. Useful surfactants include anionic, nonionic, ampholytic, zwitterionic and cationic surfactants or mixtures of such materials. Detergent compositions for laundry use typically contain from about 5% to about 30% anionic surfactants, mixtures of anionic and non-ionic surfactants or cationic surfactants.

The various classes of surfactants useful in the detergent and laundry additive compositions herein are exemplified as follows:

This class of surfactants includes alkali metal monocarboxylates (soaps) such as the sodium, potassium, ammonium and alkylolammonium salts of higher fatty acids containing from about 8 to about 24 carbon atoms and preferably from about 12 to about 18 carbon atoms. Suitable fatty acids can be obtained from natural sources such as, for instance, from plant or animal esters (e.g., palm oil, coconut oil, babassu oil, soybean oil, castor oil, tallow, whale and fish oils, grease, lard, and mixtures thereof). The fatty acids also can be synthetically prepared (e.g., by the oxidation of petroleum, or by hydrogenation of carbon monoxide by the Fischer-Tropsch process). Resin acids are suitable such as rosin and those resin acids in tall oil. Naphthenic acids are also suitable. Sodium and potassium soaps can be made by direct saponification of the fats and oils or by the neutralization of the free fatty acids which are prepared in a separate manufacturing process. Particularly useful are the sodium and potassium salts of the mixtures of fatty acids derived from coconut oil and tallow, i.e., sodium or potassium tallow and coconut soap. Soaps and fatty acids also act as detergency builders in detergent compositions because they remove multivalent ions by precipitation.

Anionic surfactants also include water-soluble salts, particularly the alkali metal and ethanolamine salts of organic sulfuric reaction products having in their molecular structure an alkyl radical containing from about 8 to about 22 carbon atoms and a sulfonic acid or sulfuric acid ester radical. (Included in the term alkyl is the alkyl portion of alkylaryl radicals). Examples of this group of nonsoap anionic surfactants are the alkyl sulfates, especially those obtained by sulfating the higher alcohols ($C_8$–$C_{18}$ carbon atoms); alkyl benzene sulfonates, in which the alkyl group contains from about 9 to about 15 carbon atoms, in straight chain or branched chain configuration, sodium alkyl glyceryl ether sulfonates; fatty acid monoglyceride sulfonates and sulfates; sulfuric acid esters of the reaction product of one mole of a $C_{12-18}$ alcohol and about 1 to 6 moles of ethylene oxide and salts of alkyl phenol ethylene oxide ether sulfate with about 1 to about 10 units of ethylene oxide per molecule and in which the alkyl radicals contain about 8 to about 12 carbon atoms.

Additional examples of non-soap anionic surfactants are the reaction products of fatty acids esterified with isethionic acid and neutralized with sodium hydroxide where, for example, the fatty acids are derived from coconut oil and sodium or potassium salts of fatty acid amide of methyl lauride in which the fatty acids, for example are derived from coconut oil.

Still other anionic surfactants include the class designated as succinamates. This class includes such surface active agents as disodium N-octadecylsulfosuccinamate; tetrasodium N-(1,2-dicarboxyethyl)N-octadecylsulfo-succinamate; the diamyl ester of sodium sulfosuccinic acid; the dihexyl ester of sodium sulfosuccinic acid and the dioctyl ester of sodium sulfosuccinic acid.

Anionic phosphate surfactants are also useful in the detergent or laundry additive compositions of the present invention. These are surface active materials having substantial detergent capability in which the anionic solubilizing group connecting hydrophobic moieties is an oxy acid of phosphorus. The more common solubilizing groups are —$SO_4H$, —$SO_3H$ and —$CO_2H$. Alkyl phosphate esters such as (R—O)$_2$PO$_2$H and ROPO$_3$H$_2$ in which R represents an alkyl chain containing from about 8 to about 20 carbon atoms are useful.

These esters can be modified by including in the molecule from one to about 40 alkylene oxide units, e.g., ethylene oxide units.

Particularly useful anionic surfactants for incorporation into the compositions herein are alkyl ether sulfates. The alkyl ether sulfates are condensation products of ethylene oxide and monohydric alcohols having about 10 to about 20 carbon atoms. Preferably, R has 12 to 18 carbon atoms. The alcohols can be derived from fats, e.g., coconut oil or tallow, or can be synthetic. Such alcohols are reacted with 0.5 to 30, and especially 1 to 6, molar proportions of ethylene oxide and the resulting mixture of molecular species, having, for example, an average of 3 to 6 moles of ethylene oxide per mole of alcohol, is sulfated and neutralized.

Other suitable anionic surfactants are olefin and paraffin sulfonates having from about 12 to about 24 carbon atoms.

Alkoxylated nonionic surfactants may be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

Alkoxylated nonionic surfactants include:

(1) The condensation product of aliphatic alcohols having from 8 to 22 carbon atoms, in either straight chain or branched chain configuration, with from about 5 to about 20 moles of ethylene oxide per mole of alcohol.

(2) The polyethylene oxide condensates of alkyl phenols, e.g., the condensation products of alkyl phenols having an alkyl group containing from about 6 to 12 carbon atoms in either a straight chain or branched chain configuration, with ethylene oxide, the ethylene oxide being present in amounts of from about 5 to about 25 moles of ethylene oxide per mole of alkyl phenol. The alkyl substituent in such compounds may be derived from polymerized propylene, diisobutylene, octene, or nonene, for example.

(3) Materials derived from the condensation of ethylene oxide with a product resulting from the reaction of propylene oxide and a compound with reactive hydrogen such as glycols and amines such as, for example, compounds containing from about 40% to about 80% polyoxyethylene by weight resulting from the reaction of ethylene oxide with a hydrophobic base constituted of the reaction product of ethylene diamine and propylene oxide.

Non-polar nonionic surfactants include the amine oxides and corresponding phosphine oxides. Useful amine oxide surfactants include those having the formula $R^1R^2R^3N \rightarrow 0$ wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and $R^2$ and $R^3$ are selected from the group consisting of alkyl radicals and hydroxyalkyl radicals containing from 1 to about 3 carbon atoms.

Specific examples of amine oxide surfactants include: dimethyldodecylamine oxide, dimethyltetradecylamine oxide, ethylmethyltetradecylamine oxide, cetyldimethylamine oxide, diethyltetradecylamine oxide, dipropyldodecylamine oxide bis-(2-hydroxyethyl)-dodecylamine oxide, bis-(2-hydroxypropyl) methyltetradecylamine oxide, dimethyl-(2-hydroxydodecyl)amine oxide, and the corresponding decyl, hexadecyl and octadecyl homologs of the above compounds.

Additional nonionic surfactants include alkyl glucosides and alkylamides.

Zwitterionic surfactants include derivatives of aliphatic quaternary ammonium, phosphonium, and sulfonium compounds in which the aliphatic moiety can be straight or branched chain and wherein one of the aliphatic substituents contains from about 8 to 24 carbon atoms and one contains an anionic water-solubilizing group. Particularly preferred zwitterionic materials are the ethoxylated ammonium sulfanates and sulfates. Ammonioamidates are also useful zwitterionic surfactants.

Ampholytic surfactants include derivatives of aliphatic-heterocyclic secondary and tertiary amines in which the aliphatic moiety can be straight chain or branched and wherein one of the aliphatic substituents contains from about 8 to about 24 carbon atoms and at least one aliphatic substituent contains an anionic water-solubilizing group.

Cationic surfactants comprise a wide variety of compounds characterized by one or more organic hydrophobic groups in the cation and generally by a quaternary nitrogen associated with an acid radical. Pentavalent nitrogen ring compounds are also considered quaternary nitrogen compounds. Suitable anions are halides, methylsulfate and hydroxide. Tertiary amines can have characteristics similar to cationic surfactants at washing solutions pH values less than about 8.5.

When cationic surfactants are used in combination with anionic surfactants and certain detergency builders including polycarboxylates, compatibility must be considered. A type of cationic surfactant generally compatible with anionic surfactants and polycarboxylates is a $C_{8-18}$ alkyl tri $C_{1-3}$ alkyl ammonium chloride or methyl sulfate.

The detergent and laundry additive compositions of the present invention optionally can contain detergency builders in addition to HZSC or novel morphological zeolite material.

Ether carboxylate compounds or mixtures described in U.S. Pat. No. 4,663,071 are useful. Suitable polycarboxylate detergency builders include the acid form and alkali metal, ammonium and substituted ammonium salts of citric, ascorbic, phytic, mellitic, benzene pentacarboxylic, oxydiacetic, carboxymethyl-oxysuccinic, carboxymethyloxymalonic, cis-cyclohexanehexacarboxylic, ciscyclopentanetetracarboxylic and oxydisuccinic acids. Also suitable are polycarboxylate polymers and copolymers. Particularly suitable are acrylic acid polymers and salts thereof and copolymers of acrylic and maleic acids and salts thereof which act as dispersants of particulate materials in wash solutions.

The polyacetal carboxylates can be incorporated in the detergent and laundry additive compositions of the invention.

Also suitable in the detergent and laundry additive compositions of the invention are the 3,3-dicarboxy-4-oxa-1,6-hexanedioates and the related compounds.

Suitable ether polycarboxylates also include cyclic compounds, particularly alicyclic compounds.

Polyphosphonate detergency builders comprise a large range of organic compounds having two or more $-C-PO_2M_2$ groups wherein M is hydrogen or a salt-forming radical. Suitable phosphonates include ethane-1-hydroxy-1, 1-diphosphonates, ethanehydroxy-1,1,2-triphosphonates and their oligomeric ester chain condensates. Suitable polyphosphonates for use in the compositions of the invention also include nitrogen-containing polyphosphonates such as ethylenediaminetetrakis (methylenephosphonic) acid and diethylenetriaminepentakis (methylene-phosphonic) acid and alkali metal, ammonium and substituted ammonium salts thereof. In common with other phosphorus-containing components, the incorporation of phosphonates may be restricted or prohibited by government regulation.

$C_{8-24}$ alkyl monocarboxylic acid and soluble salts thereof have a detergent builder function in addition to surfactant characteristics. $C_{8-24}$ alkyl, alkenyl, alkoxy and thio-substituted alkyl dicarboxylic acid compounds, such as 4-pentadecene-1,2-dicarboxylic acid, salts thereof and mixtures thereof, are also useful optional detergency builders.

Inorganic detergency builders useful in the detergent and laundry additive compositions of this invention at total combined levels of from 0% to about 75% by weight, include alkali metal phosphates, sodium aluminosilicates, including HZSC, alkali metal silicates and alkali metal carbonates.

Phosphate detergency builders include alkali metal orthophosphates which remove multivalent metal cations from laundry solutions by precipitation and the polyphosphates such as pyrophosphates, tripolyphosphates and water-soluble metaphosphates that sequester multivalent metal cations in the form of soluble complex salts or insoluble precipitating complexes. Sodium pyrophosphate and sodium tripolyphosphate are particularly suitable in granular detergent and laundry additive compositions to the extent that governmental regulations do not restrict or prohibit the use of phosphorus-containing compounds in such compositions. Granular detergent and laundry additive composition embodiments of the invention particularly adapted for use in areas where the incorporation of phosphorus-containing compounds is restricted contains low total phosphorus and, preferably, essentially no phosphorus.

Other optional builder material include aluminosilicate ion exchange materials, other than HZSC, e.g., crystalline zeolites, other than HZSC, and amorphous aluminosilicates.

Examples are available under the designation Zeolite A, Zeolite B (also referred to as Zeolite P), conventional MAP, and Zeolite X.

Other optional builders include alkali metal silicates. Suitable alkali metal silicates have a mole ratio of $SiO_2$ alkali metal oxide in the range of from about 1:1 to about 4:1. The alkali metal silicate suitable herein include commercial preparations of the combination of silicon dioxide and alkali metal oxide or carbonate fused together in varying proportions.

The term "alkali metal silicate" as used herein refers to silicate solids with any ratio of $SiO_2$ to alkali metal oxide. Silicate solids normally possess a high alkalinity content; in addition water of hydration is frequently present as, for example, in metasilicates which can exist having 5, 6, or 9 molecules of water. Sodium silicate solids with a $SiO_2:Na_2O$ mole ratio of from about 1.5 to about 3.5, are preferred in granular laundry detergent compositions.

Silicate solids are frequently added to granular detergent or laundry additive compositions as corrosion inhibitors to provide protection to the metal parts of the washing machine in which the detergent or laundry additive composition is utilized. Silicates have also been used to provide a degree of crispness and pourability to detergent or laundry additive granules which is very desirable to avoid lumping and caking.

Alkali metal carbonates are useful in the granular detergent or laundry additive compositions of the invention as a source of washing solution alkalinity and because of the ability of the carbonate ion to remove calcium and magnesium ions from washing solutions by precipitation.

Preferred granular compositions free of inorganic phosphates contain from about 8% to about 40% by weight sodium carbonate, from 0% to about 30% HZSC, from about 0.5% to about 10% sodium silicate solids, from about 5% to about 35% of ether carboxylate compounds and from about 10% to about 25% surfactant.

Additional Optional Components

Granular detergent or laundry additive compositions of this invention can contain materials such as sulfates, borates, perborates, organic peroxy acid salts, peroxy bleach precursors and activators and water of hydration.

Laundry additive compositions of this invention can contain water and other solvents. Low molecular weight pisopropanol are suitable. Monohydric alcohols are preferred for solubilizing the surfactant but polyols containing from 2 to about 6 carbon atoms and from 2 to about 6 hydroxy groups can be used and can provide improved enzyme stability. Examples of polyols include propylene glycol, ethylene glycol, glycerine and 1,2-propanediol. Ethanol is a particularly preferred alcohol.

The detergent or laundry additive compositions of the invention can also contain such materials as proteolytic and amylolytic enzymes, fabric whiteners and optical brighteners, sudsing control agents, hydrotropes such as sodium toluene, xylene or cumene sulfonate, perfumes, colorants, opacifiers, anti-redeposition agents and alkalinity control or buffering agents such as monoethanolamine and triethanolamine. The use of these materials is known in the detergent art.

Materials that provide clay soil removal/anti-redeposition benefits can also be incorporated in the detergent and laundry additive compositions of the invention. These clay soil removal/anti redeposition agents are usually included at levels of from about 0.1% to about 10% by weight of the composition.

One group of preferred clay soil removal/anti-redeposition agents are the ethoxylated amines. Another group of preferred clay soil removal/anti-redeposition agents are cationic compounds. Other clay soil removal/anti-redeposition agents which can be used include the ethoxylated amine polymers. Polyethylene glycol can also be incorporated to provide anti-redeposition and other benefits.

Soil release agents, such as disclosed in the art to reduce oily staining of polyester fabrics, are also useftil in the detergent and laundry additive compositions of the present invention. Examples are copolymers of ethylene terephthalate and polyethylene oxide terephthalate as soil release agents. Cellulose ether soil release agents and block polyester compounds are also useftil as soil release agents in detergent and laundry additive compositions.

The detergent and laundry additive compositions herein may also optionally contain one or more iron and magnesium chelating agents. Such chelating agents can be selected from the group consisting of amino carboxylates, amino phosphonates, polyfunctionally-substituted aromatic chelating agents and mixtures thereof, all as hereinafter defined.

Amino carboxylates useful as optional chelating agents in compositions of the invention include ethylenediaminetetraacetates, N-hydroxyethylethylenediaminetriacetates, nitrilotriacetates, ethylenediamine tetrapropionates, diethylenetriaminepentaacetates, and ethanoldiglycines.

Amino phosphonates are also suitable for use as chelating agents in the compositions of the invention when at least low levels of total phosphorus are permitted in detergent compositions. Compounds include ethylenediaminetetrakis (methylenephosphonates), nitrilotris (methylenephosphonates) and diethylenetriaminepentakis (methylenephosphonates). Preferably, these amino phosphonates do not contain alkyl or alkenyl groups with more than about 6 carbon atoms. Alkylene groups can be shared by substructures.

Polyfunctionally-substituted aromatic chelating agents are also useful in the compositions herein. Preferred compounds of this type in acid form are dihydroxydisulfobenzenes and 1,2-dihydroxy-3,5-disulfobenzene or other disulfonated catechols in particular. Alkaline detergent compositions can contain these materials in the form of alkali metal, ammonium or substituted ammonium (e.g., monoor triethanolamine) salts.

If utilized, optional chelating agents will generally comprise from about 0.1% to 10% by weight of the detergent or laundry additive compositions herein. More preferably chelating agents will comprise from about 0.75% to 3% by weight of such compositions.

The detergent and laundry additive compositions of this invention can also include a bleach system comprising an inorganic or organic peroxy bleaching agent and, in preferred compositions, an organic peroxy acid bleach precursor. Suitable inorganic peroxygen bleaches include sodium perborate monoand tetrahydrate, sodium percarbonate, sodium persilicate and urea-hydrogen peroxide addition products and the clathrate $4Na_2SO_4:2H_2O:lNaCl$. Suitable organic bleaches include peroxylauric acid, peroxyoctanoic acid, peroxynonanoic acid, peroxydecanoic acid, diperoxydodecanedioic acid, diperoxyazelaic acid, mono- and diperoxyphthalic acid and mono- and diperoxyisophthalic acid. The bleaching agent is generally present in the detergent and laundry additive compositions of this invention at a level of from about 5% to about 50% preferably from about 10% to about 25% by weight.

The detergent and laundry additive compositions of the invention may also contain an organic peroxy acid bleach precursor at a level of from about 0.5% to about 10%, preferably from about 1% to about 6% by weight. Suitable bleach precursors include for example, the peracetic acid bleach precursors such as tetraacetylethylenediamine, tetraacetylmethylenediarnine, tetraacetylhexylenediamine, sodium p-acetoxybenzene sulfonate, tetraacetylglycouril, pentaacetylglucose, octaacetyllactose, and methyl o-acetoxy benzoate. The alkyl group, R, can be either linear or branched and, in preferred embodiments, it contains from 7 to 9 carbon atoms.

The bleach precursor (activator) herein will non-nally be added in the form of particles comprising finely divided bleach activator and a binder. The binder generally selected from nonionic surfactants such as ethoxylated tallow alcohols, polyethylene glycols, onic surfactants, film forming polymers, fatty acids mixtures thereof. Highly preferred are nonionic surfactant binders, the bleach activator being admixed with the binder and extruded in the form of elongated particles through a radial extruder. Alternatively, the bleach activator particles can be prepared by spray drying.

In addition to their utility as builders in detergent laundry additive compositions, the novel zeolite compositions of the invention may also be utilized in other contexts wherein water hardness sequestration is required. Thus, for example, the zeolite compositions herein may be employed in water softener compositions, devices and methods. These materials are also useful in boiler descaling compositions and methods.

We claim:

1. An aluminosilicate zeolite composition comprising macroscopic aggregates consisting essentially of smaller crystals of said zeolite, said macroscopic aggregates having a macropore volume of at least 0.01 cm$^3$/g for pores between 30–1200 Å radius.

2. The composition of claim 1, wherein said macroscopic aggregates have a size range of from about 1–5 microns and said smaller crystals are submicron in size.

3. The composition of claim 2, wherein said smaller crystals have a size range of from 0.05 to 0.5 micron.

4. The composition of claim 1, wherein said macroscopic aggregates consisting essentially of said smaller crystals are formed in-situ.

5. The composition of claim 1, wherein said macroscopic aggregates have a surface area (BET) of at least 10 m$^2$/g.

6. The composition of claim 1, wherein said macroscopic aggregates have a pore volume of at least 0.04 cm$^3$/gm for pores having a 30 to 1,200 Å radius.

7. The composition of claim 1, wherein said aluminosilicate is a high aluminum zeolite having a Si/Al ratio of less than or equal to 1.1.

8. The composition of claim 7, wherein said aluminosilicate zeolite is zeolite A.

9. The zeolite composition of claim 7, wherein said aluminosilicate zeolite is a high aluminum analog of gismondine.

10. The composition of claim 7, wherein said aluminosilicate zeolite is a high aluminum analog of zeolite X.

11. The composition of claim 1, wherein said zeolite contains a positive amount up to 40% by weight relative to the total SiO$_2$ content of the zeolite as occluded silicate which is not part of the framework of said zeolite crystals.

12. The composition of claim 11, wherein said occluded silicate is present in positive amounts of up to 20% by weight based on the total SiO$_2$ content of the zeolite crystals.

13. The composition of claim 12, wherein said occluded silicate is present in positive amounts of up to 5% by weight of the total SiO$_2$ content of the zeolite crystals.

14. The composition of claim 13, wherein said occluded silicate is present in positive amounts of less than 5 wt. % of the total SiO$_2$ content of said zeolite crystals.

15. An aluminosilicate zeolite composition comprising macroscopic aggregates having a size range from about 1–5 microns consisting essentially of a plurality of smaller crystals of said zeolite, said smaller crystals being submicron in size, and wherein said aluminosilicate zeolite is a high aluminum zeolite having a Si/Al ratio of less than or equal to 1.1.

16. The composition of claim 15, wherein said smaller crystals have a size range of from 0.05 to 0.5 micron.

17. The composition of claim 15, wherein said macroscopic aggregates consisting essentially of said smaller crystals are formed in-situ.

18. The composition of claim 15, wherein said macroscopic aggregates have a surface area (BET) of at least 10 m$^2$/g.

19. The composition of claim 15, wherein said macroscopic aggregates have a macro pore volume of at least 0.01 cm$^3$/gm for pores between 30 and 1,200 Å radius.

20. The composition of claim 19, wherein said macroscopic aggregates have a pore volume of at least 0.04 cm$^3$/gm for pores having a 30 to 1,200 Å radius.

21. The composition of claim 15, wherein said aluminosilicate zeolite is zeolite A.

22. The zeolite composition of claim 15, wherein said aluminosilicate zeolite is a high aluminum analog of gismondine.

23. The composition of claim 15, wherein said aluminosilicate zeolite is a high aluminum analog of zeolite X.

24. The composition of claim 15, wherein said zeolite contains a positive amount up to 40% by weight relative to the total SiO$_2$ content of the zeolite as occluded silicate which is not part of the framework of said zeolite crystals.

25. The composition of claim 24, wherein said occluded silicate is present in positive amounts of up to 20% by weight based on the total SiO$_2$ content of the zeolite crystals.

26. The composition of claim 25, wherein said occluded silicate is present in positive amounts of up to 5% by weight of the total SiO$_2$ content of the zeolite crystals.

27. The composition of claim 26, wherein said occluded silicate is present in positive amounts of less than 5 wt. % of the total SiO$_2$ content of said zeolite crystals.

28. An aluminosilicate zeolite composition comprising in-situ formed macroscopic aggregates of a plurality of sub-micron zeolite crystals, said aluminosilicate zeolite having a Si/Al ratio of less than or equal to 1.1.

29. The composition of claim 28, wherein said macroscopic aggregates have a size of about 1–5 microns.

30. The composition of claim 28, wherein said aluminosilicate zeolite is zeolite A, zeolite X, zeolite B, zeolite P or zeolite MAP.

31. The composition of claim 28, wherein said macroscopic aggregates have a surface area (BET) of at least 10 m$^2$/g.

32. The composition of claim 28, wherein said macroscopic aggregates have a macro pore volume of at least 0.01 cm$^3$/gm for pores between 30 and 1,200 Å radius.

33. An aluminosilicate zeolite composition comprising in-situ formed macroscopic aggregates of a plurality of sub-micron zeolite crystals, said macroscopic aggregates having a macropore volume of at least 0.01 cm$^3$/g for pores between 30–1200 Å radius.

34. The composition of claim 33, wherein said macroscopic aggregates have a size of about 1–5 microns.

35. The composition of claim 33, wherein said aluminosilicate zeolite has a Si/Al ratio of less than or equal to 1.1.

36. The composition of claim 33, wherein said aluminosilicate zeolite is zeolite A, zeolite X, zeolite B, zeolite P or zeolite MAP.

37. The composition of claim 33, wherein said macroscopic aggregates have a surface area (BET) of at least 10 m$^2$/g.

* * * * *